(12) United States Patent
Shibata et al.

(10) Patent No.: US 7,218,146 B2
(45) Date of Patent: May 15, 2007

(54) TRANSMITTER CIRCUIT, RECEIVER CIRCUIT, INTERFACE CIRCUIT, AND ELECTRONIC INSTRUMENT

(75) Inventors: Yukinari Shibata, Sapporo (JP); Nobuyuki Saito, Sapporo (JP); Tomonaga Hasegawa, Sapporo (JP); Takuya Ishida, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 10/934,518

(22) Filed: Sep. 7, 2004

(65) Prior Publication Data

US 2006/0097753 A1 May 11, 2006

(30) Foreign Application Priority Data

| Sep. 5, 2003 | (JP) | ............................. 2003-314056 |
| Jan. 22, 2004 | (JP) | ............................. 2004-014413 |
| Mar. 9, 2004 | (JP) | ............................. 2004-065939 |

(51) Int. Cl.
   *H03K 19/0175* (2006.01)
(52) U.S. Cl. .......................................... 326/82; 326/83
(58) Field of Classification Search ............. 326/82–89
   See application file for complete search history.

(56) References Cited

U.S. PATENT DOCUMENTS

| 5,512,853 A | 4/1996 | Ueno et al. |
| 5,861,822 A | 1/1999 | Park et al. |
| 6,437,599 B1 * | 8/2002 | Groen ......................... 326/63 |
| 6,472,903 B1 * | 10/2002 | Veenstra et al. ............... 326/38 |
| 6,566,911 B1 * | 5/2003 | Moyer ......................... 326/83 |
| 6,611,157 B2 | 8/2003 | Usui |
| 7,034,570 B2 * | 4/2006 | McClintock et al. ......... 326/38 |
| 2005/0066077 A1 * | 3/2005 | Shibata et al. ................ 710/33 |
| 2005/0088218 A1 * | 4/2005 | Shibata et al. .............. 327/333 |
| 2006/0055426 A1 * | 3/2006 | Li ............................... 326/83 |
| 2006/0097753 A1 * | 5/2006 | Shibata et al. ................ 326/83 |
| 2006/0132181 A1 * | 6/2006 | Lee et al. ..................... 326/83 |

FOREIGN PATENT DOCUMENTS

| JP | A 6-113364 | 4/1994 |
| JP | A-6-132968 | 5/1994 |
| JP | A-7-264042 | 10/1995 |
| JP | A 8-125695 | 5/1996 |
| JP | A-8-162942 | 6/1996 |
| JP | A 10-283094 | 10/1998 |
| JP | A 2002-314397 | 10/2002 |

* cited by examiner

*Primary Examiner*—Don Le
(74) *Attorney, Agent, or Firm*—Oliff & Berridge, PLC

(57) ABSTRACT

A transmitter circuit including: a current driver which current-drives differential signal lines; and a voltage driver which is electrically disconnected from at least one of the differential signal lines in a normal transfer mode, and is electrically connected to the at least one of the differential signal lines and voltage-drives the at least one of the differential signal lines in a power-down mode. The voltage driver outputs a power-down voltage for setting a receiver circuit to the power-down mode or a wakeup voltage for canceling the power-down mode of the receiver circuit, to the at least one of the differential signal lines. The current driver transmits a power-down command to the receiver circuit by current-driving the differential signal lines in the normal transfer mode.

7 Claims, 16 Drawing Sheets

FIG. 7A
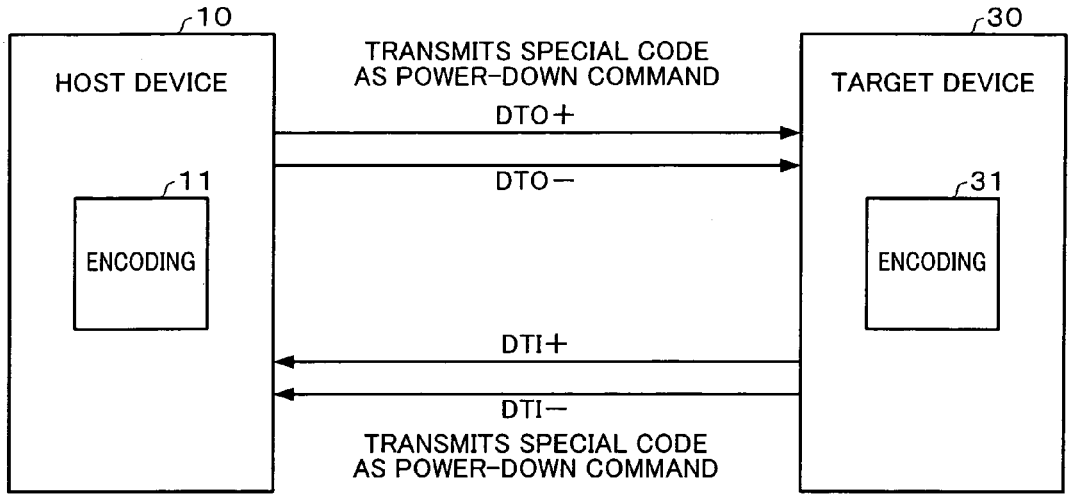
FIG. 7B
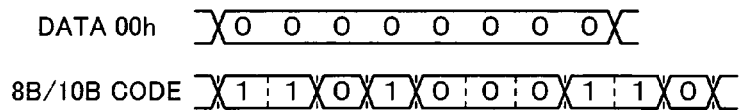
FIG. 7C
| CODE | SYMBOL | NAME |
|---|---|---|
| K28.5 | COM | Comma |
| K27.7 | STP | Start TLP |
| K28.2 | SDP | Start DLLP |
| K29.7 | END | End |
| K30.7 | EDB | EnD Bad |
| K23.7 | PAD | Pad |
| K28.0 | SKP | Skip |
| K28.1 | FTS | Fast Training Sequence |
| K28.3 | IDL | Idle |
| K28.4 | | |
| K28.6 | | |
| K28.7 | | |

FIG. 9

| | STATE | HOST FUNC- TION | TARGET CLKIN | TARGET FUNC- TION | DTO TRANS- MISSION | DTI RECEP- TION | DTI TRANS- MISSION | DTO RECEP- TION | CLK TRANS- MISSION | CLK RECEP- TION |
|---|---|---|---|---|---|---|---|---|---|---|
| | DEVICE DISABLED | × | × | × | × | × | × | × | × | × |
| T1 | TARGET DISABLED | ○ | × | × | × | × | × | × | × | × |
| T2 | OUT IDLE | ○ | ○ | ○ | ○ | — | — | ○ | ○ | ○ |
| T3 | OUT TRANSFER | ○ | ○ | ○ | ○ | — | — | ○ | ○ | ○ |
| T4 | OUT DISABLED | ○ | ○ | ○ | × | — | — | × | ○ | ○ |
| T5 | IN IDLE | ○ | ○ | ○ | — | ○ | ○ | — | ○ | ○ |
| T6 | IN TRANSFER | ○ | ○ | ○ | — | ○ | ○ | — | ○ | ○ |
| T7 | IN DISABLED | ○ | ○ | ○ | — | × | × | — | ○ | ○ |

TRANSMITTER CIRCUIT, RECEIVER CIRCUIT, INTERFACE CIRCUIT, AND ELECTRONIC INSTRUMENT

Japanese Patent Application No. 2003-314056, filed on Sep. 5, 2003, Japanese Patent Application No. 2004-14413, filed on Jan. 22, 2004, and Japanese Patent Application No. 2004-65939, filed on Mar. 9, 2004, are hereby incorporated by reference in their entirety.

BACKGROUND OF THE INVENTION

The present invention relates to a transmitter circuit, a receiver circuit, an interface circuit, and an electronic instrument.

In recent years, a high-speed serial transfer interface such as low voltage differential signaling (LVDS) has attracted attention as an interface standard aiming at reducing EMI noise or the like. In the high-speed serial transfer interface, data transfer is implemented by allowing a transmitter circuit to transmit serialized data using differential signals and a receiver circuit to differentially amplify the differential signals. Japanese Patent Application Laid-open No. 2002-314397 has disclosed a conventional technology relating to the high-speed serial transfer interface, for example.

However, since the high-speed serial transfer interface allows current to constantly flow through the transmitter circuit and the receiver circuit, a reduction of power consumption is limited. On the other hand, data transfer cannot be performed if the path of the constant current is cut. Therefore, the technical subject is to realize setting and cancellation of a power-down mode in the transmitter circuit and the receiver circuit conforming to the high-speed serial transfer interface.

BRIEF SUMMARY OF THE INVENTION

According to a first aspect of the present invention, there is provided a transmitter circuit connected to a receiver circuit with differential signal lines interposed, the transmitter circuit comprising:

a current driver which current-drives the differential signal lines; and a voltage driver which is electrically disconnected from at least one of the differential signal lines in a normal transfer mode, and is electrically connected to the at least one of the differential signal lines and voltage-drives the at least one of the differential signal lines in a power-down mode, wherein the voltage driver outputs a power-down voltage for setting the receiver circuit to the power-down mode or a wakeup voltage for canceling the power-down mode of the receiver circuit, to the at least one of the differential signal lines.

According to a second aspect of the present invention, there is provided a receiver circuit connected to a transmitter circuit which current-drives differential signal lines with the differential signal lines interposed, the receiver circuit comprising:

a current/voltage conversion circuit which performs a current/voltage conversion based on a current which flows through the differential signal lines, and outputs first and second voltage signals which make up differential voltage signals;

a comparator which compares the first and second voltage signals and outputs an output signal; and a wakeup detection circuit which is set to a disabled state in a normal transfer mode and to an enabled state in a power-down mode, detects a wakeup voltage and outputs a signal used to cancel the power-down mode when the transmitter circuit has outputted the wakeup voltage to at least one of the differential signal lines by voltage drive.

According to a third aspect of the present invention, there is provided a receiver circuit connected to a transmitter circuit which current-drives differential signal lines with the differential signal lines interposed, the receiver circuit comprising:

a current/voltage conversion circuit which performs a current/voltage conversion based on a current which flows through the differential signal lines, and outputs first and second voltage signals which form differential voltage signals;

a comparator which compares the first and second voltage signals and outputs an output signal; and a wakeup detection circuit which outputs a wakeup signal when cancellation of a power-down mode is detected after setting of the receiver circuit to a power-down mode by outputting a power-down voltage to at least one of the differential signal lines from the transmitter circuit.

BRIEF DESCRIPTION OF THE SEVERAL VIEWS OF THE DRAWING

FIGS. 7A, 7B, and 7C are diagrams for illustrating a method using a special code.

FIG. 9 is a table for describing a power-down control method according to one embodiment of the present invention.

DETAILED DESCRIPTION OF THE EMBODIMENTS

Figure 1:
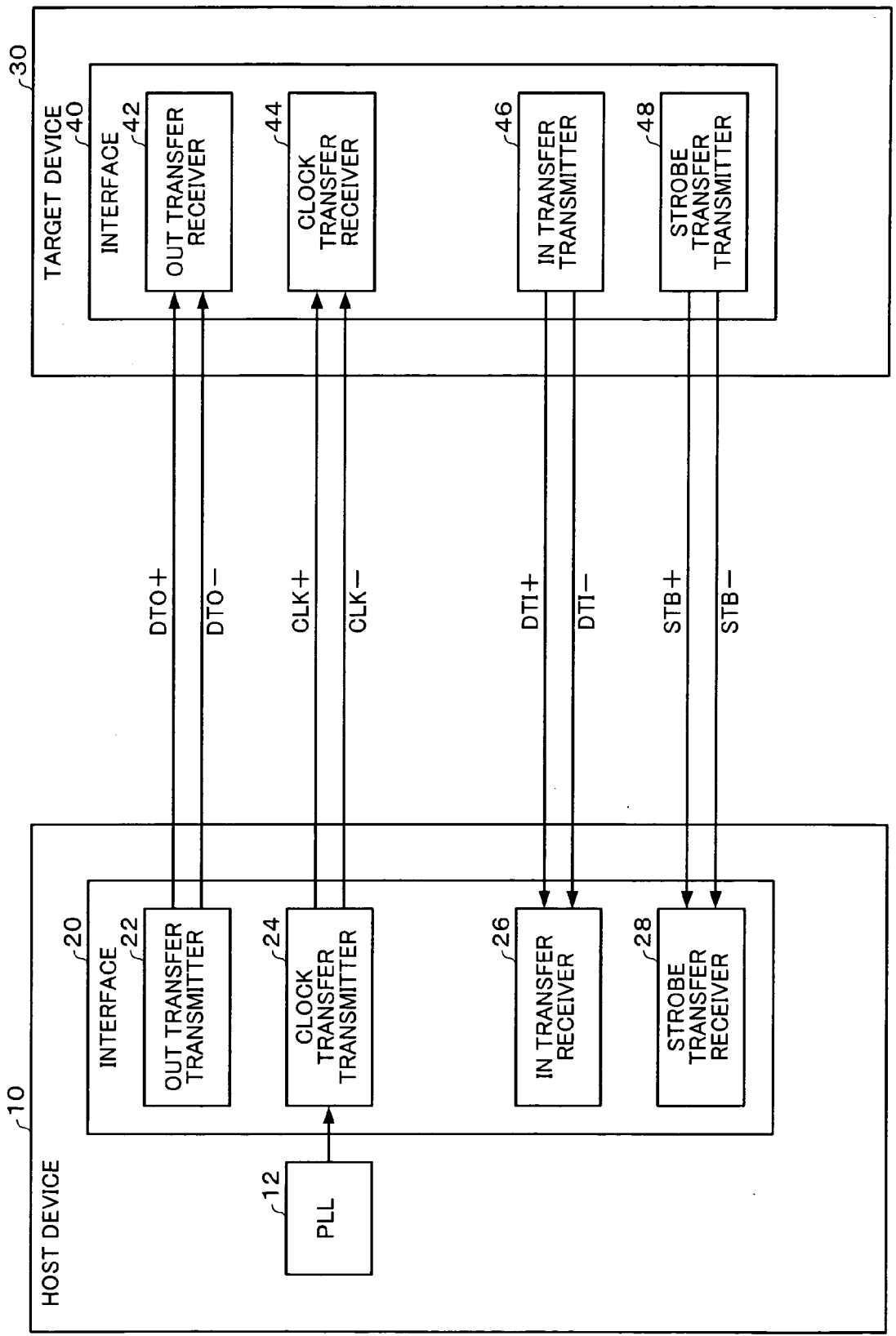
FIG. 1 is a diagram showing an interface circuit according to one embodiment of the present invention.

Embodiments of the present invention will be described below.

According to one embodiment of the present invention, there is provided a transmitter circuit connected to a receiver circuit with differential signal lines interposed, the transmitter circuit comprising:

a current driver which current-drives the differential signal lines; and a voltage driver which is electrically disconnected from at least one of the differential signal lines in a normal transfer mode, and is electrically connected to the at least one of the differential signal lines and voltage-drives the at least one of the differential signal lines in a power-down mode, wherein the voltage driver outputs a power-down voltage for setting the receiver circuit to the power-down mode or a wakeup voltage for canceling the power-down mode of the receiver circuit, to the at least one of the differential signal lines.

In this transmitter circuit, the voltage driver is electrically disconnected from at least one of the differential signal lines in the normal transfer mode, and normal transfer is performed by allowing the current driver current-drives the differential signal lines. In the power-down mode, the voltage driver is electrically connected to the at least one of the differential signal lines. The voltage driver outputs the power-down voltage or the wakeup voltage to the differential signal line (at least one of first and second signal lines) by voltage drive. Therefore, it is unnecessary to provide a signal line for transferring the power-down voltage or the wakeup voltage separately from the differential signal lines. As a result, since the number of signal lines can be reduced, a reduction of the circuit scale, facilitation of mounting, and the like can be achieved while reducing power consumption.

In this transmitter circuit, the current driver may transmit a power-down command to the receiver circuit by current-driving the differential signal lines in the normal transfer mode.

This makes it unnecessary to provide a signal line for transferring the power-down command separately from the differential signal lines. As a result, since the number of signal lines can be reduced, a reduction of the circuit scale and the like can be achieved while reducing power consumption.

In this transmitter circuit, the current driver may include: a first current source disposed between a first output node for a first signal line of the differential signal lines and a first power supply; and a second current source disposed between a second output node for a second signal line of the differential signal lines and the first power supply; and the voltage driver may include: a voltage output circuit which outputs the power-down voltage or the wakeup voltage; and a switching element which is disposed between an output of the voltage output circuit and at least one of the first and second output nodes, turned OFF in the normal transfer mode and turned ON in the power-down mode.

This makes it possible to electrically disconnect between the voltage output circuit and the differential signal lines in the normal transfer mode, because the switching element is turned OFF. Since the switching element is turned ON in the power-down mode, the power-down voltage or the wakeup voltage from the voltage output circuit can be outputted to the at least one of the differential signal lines by voltage drive.

According to one embodiment of the present invention, there is provided an interface circuit having differential signal lines, the interface circuit comprising:

the above-described transmitter circuit connected to a receiver circuit of a partner device with first differential signals line interposed to current-drive the first differential signal lines; and another receiver circuit connected to another transmitter circuit of the partner device with second differential signal lines interposed, the transmitter circuit of the partner device current-driving the second differential signal lines, wherein the receiver circuit of the interface circuit connected to the second differential signal lines includes a wakeup detection circuit, the wakeup detection circuit being set to a disabled state in the normal transfer mode, being set to an enabled state in the power-down mode, and detecting the wakeup voltage to output a signal used to cancel the power-down mode when the transmitter circuit of the partner device has outputted the wakeup voltage to at least one of the second differential signal lines by voltage drive.

This enables the receiver circuit of the partner device to be set to the power-down mode or enables the power-down mode of the receiver circuit of the partner device to be canceled, by outputting the power-down voltage or the wakeup voltage to the receiver circuit of the partner device. Moreover, the power-down mode of the receiver circuit of the interface circuit (or self device) can be canceled by detecting the wakeup voltage output from the transmitter circuit of the partner device by using the wakeup detection circuit.

According to one embodiment of the present invention, there is provided an interface circuit having differential signal lines, the interface circuit comprising:

the above-described transmitter circuit connected to a receiver circuit of a partner device with first differential signal lines interposed to current-drive the first differential signal lines; and another receiver circuit connected to another transmitter circuit of the partner device with second differential signal lines interposed, the transmitter circuit of the partner device current-driving the second differential signal lines, wherein the receiver circuit of the interface circuit connected to the second differential signal lines includes a wakeup detection circuit, the wakeup detection circuit outputting a wakeup signal when cancellation of the power-down mode is detected after the receiver circuit of the interface circuit has been set to the power-down mode by output of the power-down voltage to the at least one of the second differential signal lines from the transmitter circuit of the partner device.

This enables the receiver circuit of the partner device to be set to the power-down mode or enables the power-down mode of the receiver circuit of the partner device to be canceled, by outputting the power-down voltage or the wakeup voltage to the receiver circuit of the partner device. Moreover, when the power-down mode of the interface circuit (or self device) is canceled by the partner device, a logic circuit in a higher layer can be notified of the cancellation of the power-down mode by using the wakeup signal.

According to one embodiment of the present invention, there is provided a receiver circuit connected to a transmitter circuit which current-drives differential signal lines with the differential signal lines interposed, the receiver circuit comprising:

a current/voltage conversion circuit which performs a current/voltage conversion based on a current flowing through the differential signal lines, and outputs first and second voltage signals which form differential voltage signals;

a comparator which compares the first and second voltage signals and outputs an output signal; and a wakeup detection circuit which is set to a disabled state in a normal transfer mode and to an enabled state in a power-down mode, detects a wakeup voltage and outputs a signal which is used to cancel the power-down mode when the transmitter circuit has outputted the wakeup voltage to at least one of the differential signal lines by voltage drive.

In this normal transfer mode, normal transfer is implemented by the current/voltage conversion circuit and the comparator, and the wakeup detection circuit is set to the disabled state. In the power-down mode, the wakeup detection circuit is set to the enabled state. The power-down mode can be canceled by allowing the wakeup detection circuit to detect the wakeup voltage output from the transmitter circuit. Therefore, the power-down mode can be canceled by detecting the wakeup voltage output to the at least one of the differential signal lines without providing a signal line for transferring the wakeup voltage separately from the differential signal lines. As a result, since the number of signal lines can be reduced, a reduction of the circuit scale, facilitation of mounting, and the like can be achieved while reduction of power consumption.

This receiver circuit may further comprise:

a power-down detection circuit which detects a power-down command based on a comparison result from the comparator when the transmitter circuit has transmitted the power-down command by current-driving the differential signal lines in the normal transfer mode; and a power-down setting circuit which sets at least one of the current/voltage conversion circuit and the comparator to the power-down mode and sets the wakeup detection circuit to an enabled state, when the power-down detection circuit has detected the power-down command.

In this receiver circuit, the transmitter circuit transmits the power-down command to the receiver circuit by current-driving the differential signal lines. The power-down command is detected based on the comparison result from the comparator (or an output signal of the comparator, a signal generated by subjecting the output signal of the comparator to predetermined processing such as serial/parallel conversion or the like). When the power-down command is detected, at least one of the current/voltage conversion circuit and the comparator is set to the power-down mode, whereby a reduction of power consumption is implemented. Moreover, the wakeup detection circuit can be set to the enabled state. In this way, the power-down command transmitted by current-driving the differential signal lines is detected, and the power-down mode is thus set. Therefore, it is unnecessary to provide a signal line for transferring the power-down command separately from the differential signal lines.

In this receiver circuit, the power-down setting circuit may include a holding circuit which holds power-down setting information when the power-down command is detected, until the power-down mode is canceled; and the power-down setting circuit may set at least one of the current/voltage conversion circuit and the comparator to the power-down mode and set the wakeup detection circuit to the enabled state when the power-down setting information is held by the holding circuit.

This enables the power-down mode to be maintained insofar as the power-down setting information is held by the holding circuit, whereby a stable power-down operation can be implemented. Moreover, the power-down mode can be canceled merely by clearing the power-down setting information held by the holding circuit.

In this receiver circuit, the power-down setting circuit may cancel the power-down mode, set at least one of the current/voltage conversion circuit and the comparator to the normal transfer mode, and set the wakeup detection circuit to a disabled state when the wakeup voltage is detected.

This enables the normal transfer using the current/voltage conversion circuit and the comparator to be resumed by canceling the power-down mode. Moreover, since the wakeup detection circuit is set to the disabled state, occurrence of an erroneous detection operation can be prevented.

In this receiver circuit, the transmitter circuit connected to the receiver circuit with the differential signal lines interposed may transmit a plurality of power-down commands by current-driving the differential signal lines; and the power-down setting circuit may set at least one of the current/voltage conversion circuit and the comparator to the power-down mode when the power-down detection circuit detects the plurality of power-down commands.

This enables a stable power-down operation to be implemented even when a transfer error or the like occurs.

In this receiver circuit, the transmitter circuit may transfer a special code obtained by using an encoding method which expands a bit width, as the power-down command; and the power-down detection circuit may detect the power-down command by detecting the special code.

This facilitates transmission of the power-down command.

According to one embodiment of the present invention, there is provided a receiver circuit connected to a transmitter circuit which current-drives differential signal lines with the differential signal lines interposed, the receiver circuit comprising:

a current/voltage conversion circuit which performs a current/voltage conversion based on a current which flows through the differential signal lines, and outputs first and second voltage signals which form differential voltage signals;

a comparator which compares the first and second voltage signals and outputs an output signal; and a wakeup detection circuit which outputs a wakeup signal when cancellation of a power-down mode is detected after setting of the receiver circuit to a power-down mode by outputting a power-down voltage to at least one of the differential signal lines from the transmitter circuit.

In this receiver circuit, normal transfer is implemented by the current/voltage conversion circuit and the comparator in the normal transfer mode. When the transmitter circuit outputs the power-down voltage to at least one of the differential signal lines, the receiver circuit is set to the power-down mode. When the power-down mode of the receiver circuit is canceled by the transmitter circuit, a logic circuit or the like in a higher layer can be notified of the cancellation of the power-down mode by using the wakeup signal.

This receiver circuit may further comprise:

a power-down detection circuit which detects a power-down command based on a comparison result from the comparator when the transmitter circuit has transmitted the power-down command by current-driving the differential signal lines in a normal transfer mode; and a power-down setting circuit which sets at least one of the current/voltage conversion circuit and the comparator to the power-down mode when the power-down detection circuit has detected the power-down command and the transmitter circuit has output the power-down voltage to the at least one of the differential signal lines.

In this receiver circuit, the transmitter circuit transmits the power-down command to the receiver circuit by current-driving the differential signal lines. This enables the receiver circuit to make preparations for transition to the power-down mode. The transmitter circuit then transmits the power-down voltage to the at least one of the differential signal lines by voltage drive. This causes at least one of the current/voltage conversion circuit and the comparator to be set to the power-down mode, whereby a reduction of power consumption is implemented.

In this receiver circuit, the wakeup detection circuit may make the wakeup signal active when a voltage level of the at least one of the differential signal lines changes from a power-down voltage level to another voltage level after the power-down command has been detected and an output signal of the power-down detection circuit has been made active.

When the power-down voltage level is in the high level, another voltage level is the low level or a voltage level close to the low level. When the power-down voltage level is the low level, another voltage level is the high level or a voltage level close to the high level.

According to one embodiment of the present invention, there is provided an interface circuit having a differential signal interface, the interface circuit comprising:

any of the above-described receiver circuits connected to a transmitter circuit of a partner device with first differential signal lines interposed, the transmitter circuit of the partner device current-driving the first differential signal lines; and another transmitter circuit connected to another receiver circuit of the partner device with second differential signal lines interposed to current-drive the second differential signal lines, wherein the transmitter circuit of the interface circuit connected to the second differential signal lines includes:

a current driver which current-drives the second differential signal lines; and a voltage driver which is electrically disconnected from the at least one of the second differential signal lines in a normal transfer mode, and is electrically connected to the at least one of the second differential signal lines and voltage-drives the at least one of the second differential signal lines in a power-down mode; and wherein the voltage driver outputs a power-down voltage for setting the receiver circuit of the partner device to the power-down mode or a wakeup voltage for canceling the power-down mode of the receiver circuit of the partner device, to the at least one of the second differential signal lines.

This enables the power-down mode of the receiver circuit of the interface circuit (or self device) to be set or canceled by detecting the power-down voltage or the wakeup voltage transmitted from the transmitter circuit of the partner device, and enables the power-down mode of the receiver circuit of the partner device to be set or canceled by outputting the power-down voltage or the wakeup voltage to the receiver circuit of the partner device.

According to one embodiment of the present invention, there is provided an interface circuit having a differential signal interface, the interface circuit comprising:

any of the above-described receiver circuits which is used for data transfer and is connected to a data transfer transmitter circuit with data transfer differential signal lines interposed, the data transfer transmitter circuit current-driving the data transfer differential signal lines; and a clock transfer receiver circuit connected to a clock transfer transmitter circuit with clock transfer differential signal lines interposed, the clock transfer transmitter circuit current-driving the clock transfer differential signal lines, wherein the data transfer receiver circuit outputs a signal for canceling a power-down mode of the clock transfer receiver circuit when the power-down mode of the data transfer receiver circuit is canceled.

This enables the power-down mode of the clock transfer receiver circuit to be canceled when the power-down mode of the data transfer receiver circuit is canceled. This prevents occurrence of a problem in which an unnecessary element or the like is added to the clock transfer differential signal lines, whereby a decrease in transfer performance can be prevented.

According to one embodiment of the present invention, there is provided an electronic instrument comprising:

any of the above-described interface circuits; and at least one of a communication device, a processor, an imaging device, and a display device.

These embodiments of the present invention will be described in detail below. Note that the embodiments described below do not in any way limit the scope of the invention laid out in the claims herein. In addition, not all of the elements of the embodiments described below should be taken as essential requirements of the present invention.

1. Interface Circuit

An interface circuit according to one embodiment of the present invention is described with reference to FIG. 1. In this embodiment, a host device 10 is the side which supplies a clock signal, and a target device 30 is the side which operates using the supplied clock signal as a system clock signal.

In FIG. 1, DTO+ and DTO− are data (OUT data) output to the target device 30 (device in a broad sense) from the host device 10 (device in a broad sense). CLK+ and CLK− are clock signals supplied to the target device 30 from the host device 10. The host device 10 outputs the data DTO+/− in synchronization with the edge (rising edge or falling edge) of the clock signals CLK+/−. Therefore, the target device 30 can sample and capture the data DTO+/− using the clock signals CLK+/−. In FIG. 1, the target device 30 operates based on the clock signals CLK+/− supplied from the host device 10. Specifically, the clock signals CLK+/− become the system clock signals of the target device 30. Therefore, a phase locked loop (PLL) circuit 12 (clock generation circuit in a broad sense) is provided in the host device 10, and is not provided in the target device 30.

DTI+ and DTI− are data (IN data) output to the host device 10 from the target device 30. STB+ and STB− are strobes (clock signals in a broad sense) supplied to the host device 10 from the target device 30. The target device 30 generates and outputs the strobes STB+/− based on the clock signals CLK+/− supplied from the host device 10. The target device 30 outputs the data DTI+/− in synchronization with the edge (rising edge or falling edge) of the strobes STB+/−. Therefore, the host device 10 can sample and capture the data DTI+/− using the strobes STB+ and STB−.

Each of the data DTO+/−, the clock signals CLK+/−, the data DTI+/−, and the strobes STB+/− is transmitted by allowing a transmitter circuit (driver circuit) to current-drive the corresponding differential signal lines (serial signal line in a broad sense). In order to realize a higher speed transfer, two or more pairs of the DTO+/− differential signal lines and the DTI+/− differential signal lines may be provided.

An interface circuit 20 of the host device 10 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. An interface circuit 40 of the target device 30 includes OUT transfer and clock transfer receiver circuits 42 and 44, and IN transfer and strobe transfer transmitter circuits 46 and 48. Some of these circuit blocks may be omitted.

The OUT transfer and clock transfer transmitter circuits 22 and 24 respectively transmit the data DTO+/− and the clock signals CLK+/− by current-driving the DTO+/− differential signal lines and the CLK+/− differential signal lines. The OUT transfer and clock transfer receiver circuits 42 and 44 respectively receive the data DTO+/− and the clock signals CLK+/− by performing a current/voltage conversion based on the current which flows through the DTO+/− differential signal lines and the CLK+/− differential signal lines, and performing comparison processing (differential amplification processing) between differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines. The IN transfer and strobe transfer receiver circuits 26 and 28 respectively receive the data DTI+/− and the strobes STB+/− by performing a current/voltage conversion based on the current which flows through the DTI+/− differential signal lines and the STB+/− differential signal lines, and performing comparison processing (differential amplification processing) between differential voltage signals (first and second voltage signals) obtained by the current/voltage conversion.

2. Configuration of Transmitter Circuit and Receiver Circuit

Figure 2:
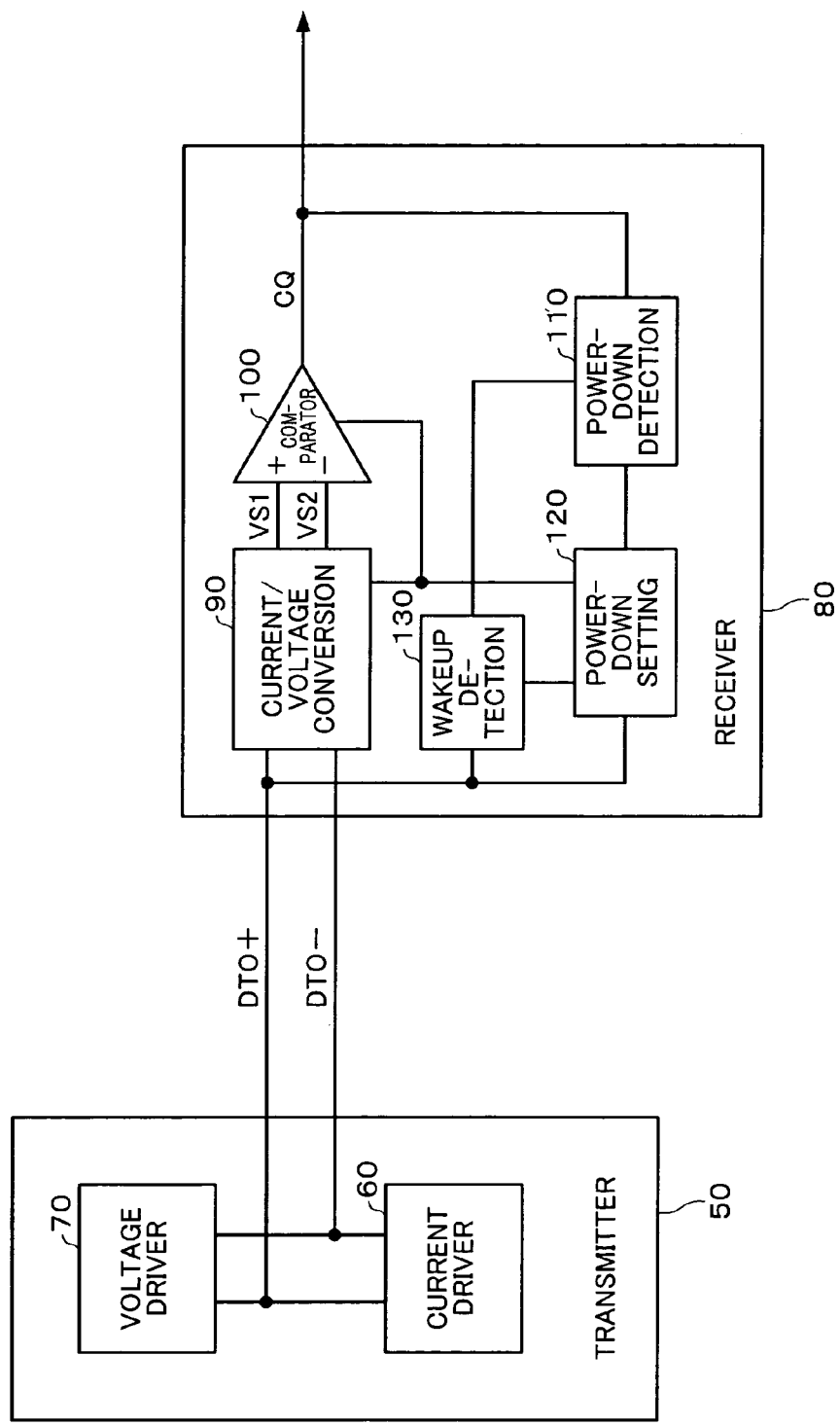
FIG. 2 is a diagram showing a transmitter circuit and a receiver circuit according to one embodiment of the present invention.

FIG. 2 is a diagram showing the transmitter circuit (driver circuit) and the receiver circuit in this embodiment. The configurations and operations of the transmitter circuit and the receiver circuit for the data DTO+/− are mainly described below. However, the configurations and operations of the transmitter circuits and the receiver circuits for the clock signals CLK+/−, the data DTI+/−, and the strobes STB+/− are the same as those of the transmitter circuit and the receiver circuit for the data DTO+/−.

A transmitter circuit 50 includes a current driver 60 and a voltage driver 70. A receiver circuit 80 includes a current/voltage conversion circuit 90, a comparator 100, a power-down detection circuit 110, a power-down setting circuit 120, and a wakeup detection circuit 130 (wakeup detection buffer). The power-down setting circuit 120 may have a configuration in which some of these circuit blocks are omitted.

The current driver 60 is a driver which current-drives the DTO+/− differential signal lines (serial signal line). In more detail, the current driver 60 alternately repeats a current drive which causes current to flow through the DTO+ signal line (first signal line of the differential signal lines in a broad sense) and a current drive which causes current to flow through the DTO− signal line (second signal line of the differential signal lines in a broad sense). The current driver 60 may alternately repeat a current drive in a first current path consisting of the DTO+ signal line as the outward path and the DTO− signal line as the return path (current path from the DTO+ signal line to the DTO− signal line) and a current drive in a second current path consisting of the DTO− signal line as the outward path and the DTO+ signal line as the return path (current path from the DTO− signal line to the DTO+ signal line). The current driver 60 may be formed by a current source (constant current source), a switching element (transistor) which performs current control for causing current from the current source to flow through the DTO+/− signal lines, and the like.

The voltage driver 70 is electrically disconnected from the DTO+/− differential signal lines in a normal transfer mode, and is electrically connected to the differential signal lines and voltage-drives the differential signal lines in a power-down mode. The voltage driver 70 outputs a power-down voltage (voltage for setting the receiver circuit 80 in the power-down mode) or a wakeup voltage (voltage for canceling the power-down mode of the receiver circuit 80) to the differential signal lines. The voltage driver 70 may be formed by a circuit which outputs the power-down voltage or the wakeup voltage at a CMOS voltage level (voltage level which can cause a CMOS transistor to be turned ON/OFF), a switching element (transistor) which electrically connects/disconnects the output of the circuit with/from the differential signal lines, and the like.

The normal transfer mode is a mode in which the data or the clock signal (strobe) is normally transferred between the devices (between the host device and the target device). The power-down mode is a mode in which power consumption is reduced by limiting or terminating current which flows through the transmitter circuit, the receiver circuit, or other circuits included in the device. In the voltage drive, the voltage of the differential signal lines is changed at the CMOS voltage level, for example. In the current drive, the voltage of the differential signal lines is changed at a voltage lower than the CMOS voltage level.

The current/voltage conversion circuit 90 performs a current/voltage conversion based on the current which flows through the differential signal lines, and outputs first and second voltage signals VS1 and VS2 which make up the differential voltage signals. In more detail, when the transmitter circuit 50 current-drives the DTO+ signal line, the current/voltage conversion circuit 90 performs a current/voltage conversion based on the current which flows through the DTO+ signal line to generate the first voltage signal VS1. When the transmitter circuit 50 current-drives the DTO− signal line, the current/voltage conversion circuit 90 performs a current/voltage conversion based on the current which flows through the DTO− signal line to generate the second voltage signal VS2. Or, when the transmitter circuit 50 alternately repeats the current drive in the first current path from the DTO+ signal line to the DTO− signal line and the current drive in the second current path from the DTO− signal line to the DTO+ signal line, the current/voltage conversion circuit 90 may generate the first and second voltage signals VS1 and VS2 across a resistor element (termination resistor) provided between the input node of the DTO+ signal line and the input node of the DTO− signal line.

The comparator (operational amplifier) 100 compares the first and second voltage signals VS1 and VS2 (amplifies the voltage between the first and second voltage signals VS1 and VS2), and outputs an output signal CQ (amplified signal). The comparator 100 outputs the output signal CQ at the H level (logic "1") of the CMOS voltage level when the voltage of the first voltage signal VS1 is higher than the voltage of the second voltage signal VS2, for example. The comparator 100 outputs the output signal CQ at the L level (logic "0") of the CMOS voltage level when the voltage of the second voltage signal VS2 is higher than the voltage of the first voltage signal VS1, for example.

The power-down detection circuit 110 is a circuit which detects a power-down command. In more detail, when the transmitter circuit 50 transmits the power-down command by current-driving the differential signal lines in the normal transfer mode (when the transmitter circuit 50 transmits transfer data including the power-down command), the power-down detection circuit 110 detects the transmitted power-down command based on the detection result from the comparator 100. In this case, the power-down detection circuit 110 may convert the output signal CQ from the comparator 100 from serial data to parallel data, and detect the power-down command based on the converted parallel data (detection result in a broad sense). The power-down detection circuit 110 may directly detect the power-down command from the output signal CQ (detection result in a broad sense) in the form of serial data.

The power-down setting circuit 120 is a circuit which sets the receiver circuit 80 in the power-down mode. In more detail, the power-down setting circuit 120 sets the current/voltage conversion circuit 90 and the comparator 100 in the power-down mode when the power-down command is detected. In this case, the power-down setting circuit 120 may set only one of the current/voltage conversion circuit 90 and the comparator 100 in the power-down mode, or may set both the current/voltage conversion circuit 90 and the comparator 100 in the power-down mode. The power-down setting circuit 120 may set other circuits included in the receiver circuit 80 in the power-down mode, or may set other circuits included in the device (target device or host device) which includes the receiver circuit 80 in the power-down mode.

The wakeup detection circuit 130 is a circuit for detecting the wakeup state. In more detail, the wakeup detection circuit 130 detects the wakeup voltage output to the differential signal lines (at least one of the DTO+ signal line and the DTO− signal line) from the voltage driver 70. When the wakeup detection circuit 130 detects the wakeup voltage, the power-down mode set by the power-down setting circuit 120 is canceled, whereby the receiver circuit 80 transitions to the normal transfer mode. The wakeup detection circuit 130 may be a circuit which outputs the wakeup signal when cancellation of the power-down mode is detected after the receiver circuit 80 has been set to the power-down mode by output of the power-down voltage to the differential signal lines.

In this embodiment, the transmitter circuit 50 transmits the power-down command to the receiver circuit 80 by current-driving the differential signal lines. When the power-down detection circuit 110 detects the transmitted power-down command, the power-down setting circuit 120 sets the current/voltage conversion circuit 90 and the comparator 100 in the power-down mode. Therefore, according to this embodiment, current which constantly flows through the current/voltage conversion circuit 90 and the comparator 100 can be limited or terminated in the power-down mode, whereby power consumption can be reduced.

Moreover, according to this embodiment, the transmitter circuit 50 can individually set the receiver circuit 80 in the power-down mode. Specifically, in FIG. 1, the OUT transfer and clock transfer transmitter circuits 22 and 24 can respectively and individually set the OUT transfer and clock transfer receiver circuits 42 and 44 in the power-down mode. Or, the IN transfer and strobe transfer transmitter circuits 46 and 48 can respectively and individually set the IN transfer and strobe transfer receiver circuits 26 and 28 in the power-down mode. Therefore, a more minute and intelligent power-down control can be implemented.

According to this embodiment, since the power-down command is transmitted in the normal transfer mode through the differential signal lines, it is unnecessary to separately provide a control signal line exclusively for transmission of the power-down command. Therefore, since the number of signal lines can be reduced, a reduction of the circuit scale, facilitation of mounting, and a reduction of product cost can be achieved.

According to this embodiment, the voltage driver 70 is electrically connected to the differential signal lines in the power-down mode, and outputs the wakeup voltage to the receiver circuit 80 through the differential signal lines. When the wakeup detection circuit 130 detects the wakeup voltage, the power-down mode is canceled. Therefore, the transmitter circuit 50 can cancel the power-down mode of the receiver circuit 80, even if the current/voltage conversion circuit 90 and the comparator 100 are set to the power-down mode and a power-down cancel command cannot be transmitted by current-driving the differential signal lines. Moreover, since the power-down mode is canceled by voltage-driving the differential signal lines using the wakeup voltage, it is unnecessary to separately provide a control signal line exclusively for transmission of the power-down cancel command. As a result, since the number of signal lines can be reduced, a reduction of the circuit scale, facilitation of mounting, and a reduction of product cost can be achieved.

According to this embodiment, when the power-down voltage is output to the differential signal lines by the voltage driver 70 after the power-down command has been transmitted, the receiver circuit 80 is set to the power-down mode. When cancellation of the power-down mode is detected, the wakeup detection circuit 130 outputs the wakeup signal. This facilitates the power-down setting and the cancellation sequence.

According to this embodiment, the voltage driver 70 is electrically disconnected from the differential signal lines in the normal transfer mode. Therefore, an adverse effect on the normal transfer, in which the differential signal lines are current-driven, can be minimized.

3. First Configuration Example

Figure 3:
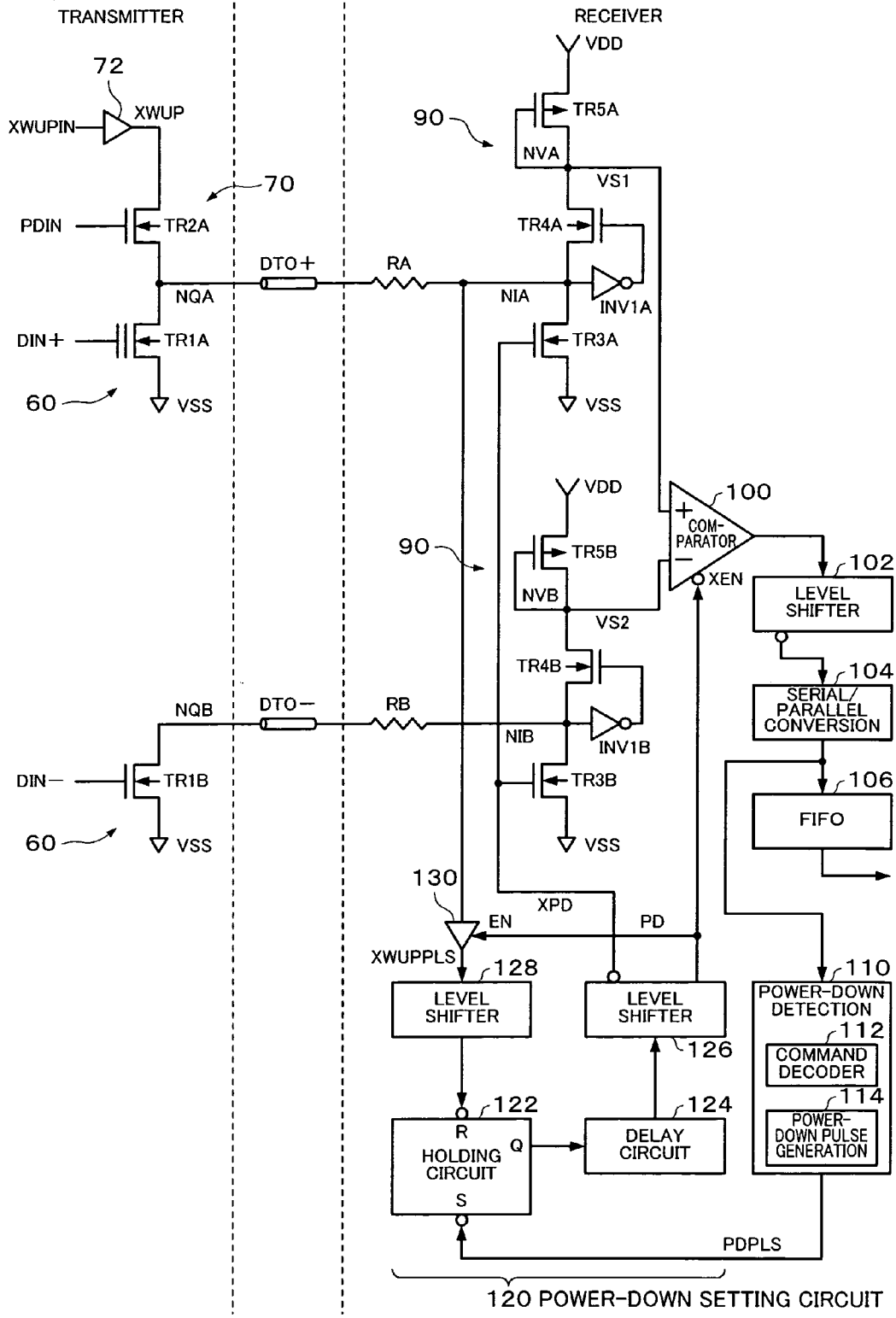
FIG. 3 is a diagram showing a detailed first configuration example of a transmitter circuit and a receiver circuit according to one embodiment of the present invention.

FIG. 3 shows a detailed first configuration example of the transmitter circuit and the receiver circuit. The transmitter circuit and the receiver circuit do not necessarily include all of the circuit elements shown in FIG. 3. The transmitter circuit and the receiver circuit may have a configuration in which some of the circuit elements are omitted.

The current driver 60 of the transmitter circuit includes an N-type (first conductivity type in a broad sense) transistor TR1A (first current source in a broad sense) provided between a first output node NQA and a power supply VSS (first power supply in a broad sense) on the side of the DTO+ signal line (first signal line in a broad sense). The current driver 60 includes an N-type transistor TR1B (second current source in a broad sense) provided between a second output node NQB and the power supply VSS on the side of the DTO− signal line (second signal line in a broad sense). In more detail, the output node NQA is connected to a drain terminal of the transistor TR1A, a positive-side first input signal DIN+ is input to a gate terminal of the transistor TR1A, and the power supply VSS is connected to a source terminal of the transistor TR1A. The output node NQB is connected to a drain terminal of the transistor TR1B, a negative-side second input signal DIN− is input to a gate terminal of the transistor TR1B, and the power supply VSS is connected to a source terminal of the transistor TR1B. A certain amount of current is caused to flow through the current sources formed by the transistors TR1A and TR1B.

The transistor TR1A is turned ON when the input signal DIN+ becomes active (H level), whereby current flows through the path from the input node NIA of the receiver circuit on the side of the DTO+ signal line to the output node NQA of the transmitter circuit. The transistor TR1B is turned ON when the input signal DIN− becomes active, whereby current flows through the path from the input node NIB of the receiver circuit on the side of the DTO− signal line to the output node NQB of the transmitter circuit. Therefore, the DTO+/− differential signal lines can be differentially current-driven by alternately activating the input signals DIN+ and DIN−.

In FIG. 3, the transistors TR1A and TR1B have the function of the current source and the function of controlling the current which flows through the current source. However, the current source provided between the node NQA and the power supply VSS (first power supply) may be formed by the transistor TR1A (switching element in a broad sense) and a current source (transistor to which a reference voltage is input at a gate terminal, for example) provided between the transistor TR1A and the power supply VSS. The current source provided between the node NQB and the power supply VSS may be formed by the transistor TR1B (switching element in a broad sense) and a current source provided between the transistor TR1B and the power supply VSS. This realizes control which causes or does not cause the current from the current sources (constant current sources) to flow through the DTO+/− differential signal lines by ON/OFF controlling the transistors TR1A and TR1B. The current source provided between the node NQA and the power supply VSS may be formed by a current source (constant current source) which causes a large amount of current (constant current) to flow when the input signal DIN+ is active (H level), and causes a small amount of current (constant current) to flow when the input signal DIN+ is inactive (L level). The current source provided between the node NQB and the power supply VSS may be formed by a current source (constant current source) which causes a large amount of current (constant current) to flow when the input signal DIN− is active, and causes a small amount of current (constant current) to flow when the input signal DIN− is inactive. In FIG. 3, the current sources implemented by the transistors TR1A and TR1B respectively cause current to flow from the receiver circuit to the transmitter circuit when the input signals DIN+ and DIN− are active. However, the current sources may cause current to flow from the transmitter circuit to the receiver circuit. In this case, the first power supply is a power supply VDD, for example.

The voltage driver 70 of the transmitter circuit includes an N-type transistor TR2A (switching element in a broad sense). The transistor TR2A functions as a switching element which is turned OFF in the normal transfer mode and is turned ON in the power-down mode. The output node NQA (or NQB) is connected to a source terminal of the transistor TR2A, and the output of the voltage output circuit 72 is connected to a drain terminal of the transistor TR2A. The transistor TR2A is turned OFF in the normal transfer mode and is turned ON in the power-down mode based on a power-down input signal PDIN input to the gate terminal. This allows the voltage driver 70 to be electrically disconnected from the differential signal lines in the normal transfer mode and to be electrically connected to the differential signal lines in the power-down mode. The voltage driver 70 voltage-drives the differential signal lines by using the voltage output circuit 72 when connected to the differential signal lines.

A wakeup input signal XWUPIN and the power-down input signal PDIN are generated by a layer (link layer or application layer) higher than the transmitter circuit which is a physical layer circuit. Specifically, when setting the receiver circuit in the power-down mode, the higher layer sets the signal PDIN at active (H level). When canceling the power-down mode of the receiver circuit, the higher layer sets the signal XWUPIN at active (L level).

The voltage output circuit 72 (voltage output buffer) is a circuit which voltage-drives the differential signal lines by outputting the signal XWUP at the CMOS voltage level. The voltage output circuit 72 outputs a voltage at the H level of the CMOS voltage level in the power-down mode (initial stage of the power-down mode), for example. The voltage output circuit 72 outputs a voltage (wakeup voltage) at the L level of the CMOS voltage level when canceling the power-down mode, for example.

In FIG. 3, the voltage output circuit 72 and the transistor TR2A which make up the voltage driver 70 are provided on the side of the DTO+ signal line (between the power supply VDD and the output node NQA). However, the voltage output circuit 72 and the transistor TR2A may be provided on the side of the DTO− signal line (between the power supply VDD and the output node NQB). A part or the entirety of the voltage driver 70 may be provided both on the side of the DTO+ signal line and the side of the DTO− signal line.

The current/voltage conversion circuit 90 of the receiver circuit includes a transistor TR3A (first current source on the side of the receiver circuit in a broad sense) provided between the input node NIA and the power supply VSS (first power supply), and a transistor TR3B (second current source on the side of the receiver circuit in a broad sense) provided between the input node NIB and the power supply VSS. A certain amount of current is caused to flow through the current sources formed by the transistors TR3A and TR3B. The voltages of the input nodes NIA and NIB and the voltage output nodes NVA and NVB can be maintained within a predetermined range by causing current to constantly and continuously flow through the transistors TR3A and TR3B, even if the transistors TR1A and TR1B are in the OFF state. Therefore, the operation speed of the current/voltage conversion circuit 90 can be increased.

In FIG. 3, the transistors TR3A and TR3B have the function of the current source and the function of controlling the current which flows through the current source. However, the current source provided between the node NIA and the power supply VSS (first power supply) may be formed by the transistor TR3A (switching element in a broad sense) and a current source (transistor to which the reference voltage is input at a gate terminal, for example) provided between the transistor TR3A and the power supply VSS. The current source provided between the node NIB and the power supply VSS may be formed by the transistor TR3B (switching element in a broad sense) and a current source provided between the transistor TR3B and the power supply VSS.

The current/voltage conversion circuit 90 includes a first inverter circuit INV1A (voltage amplifier circuit) of which the input is connected to the input node NIA, and a second inverter circuit INV1B (voltage amplifier circuit) of which the input is connected to the input node NIB. The current/voltage conversion circuit 90 includes an N-type transistor TR4A (first variable resistor element in a broad sense) of which the source terminal is connected to the input node NIA, the gate terminal is connected to the output of the inverter circuit INV1A, and the drain terminal is connected to the voltage output node NVA. The current/voltage conversion circuit 90 includes an N-type transistor TR4B (second variable resistor element in a broad sense) of which the source terminal is connected to the input node NIB, the gate terminal is connected to the output of the inverter circuit INV1B, and the drain terminal is connected to the voltage output node NVB.

The transistors TR4A and TR4B function as variable resistor elements of which the resistance is variably controlled based on the voltages (potentials) of the input nodes NIA and NIB, respectively. The inverter circuits INV1A and INV1B function as circuits which control the ON-resistance of the transistors TR4A and TR4B by amplifying the changes in voltage of the input nodes NIA and NIB, respectively. In more detail, when the transistors TR1A and TR1B are turned ON and the voltages of the input nodes NIA and NIB are changed to the L (low) level, the inverter circuits INV1A and INV1B amplify the changes in voltage. This causes the output voltages of the inverter circuits INV1A and INV1B to be changed to the H (high) level, whereby the ON-resistance of the transistors TR4A and TR4B is decreased. This enables the change in current which is caused to flow by the transistors TR1A and TR1B to be amplified (accelerated), whereby the voltages of the voltage output nodes NVA and NVB can be quickly changed to the L level. Specifically, a minute change in current at the nodes NIA and NIB (transistors TR1A and TR1B) can be amplified and transmitted to the nodes NVA and NVB (transistors TR5A and TR5B) by providing the transistors TR4A and TR4B and the inverter circuits INV1A and INV1B. The current/voltage conversion circuit 90 may have a configuration in which the transistors TR4A and TR4B and the inverter circuits INV1A and INV1B are omitted.

The current/voltage conversion circuit 90 includes a P-type (second conductivity type in a broad sense) transistor TR5A (first current/voltage conversion element in a broad sense) provided between the voltage output node NVA and the power supply VDD (second power supply in a broad sense), and a P-type transistor TR5B (second current/voltage conversion element in a broad sense) provided between the voltage output node NVB and the power supply VDD. In more detail, the transistors TR5A and TR5B are connected to the power supply VDD at a source terminal and are connected to the voltage output nodes NVA and NVB at a gate terminal and a drain terminal, respectively. The transistors TR5A and TR5B function as current/voltage conversion elements (load elements) which convert current which flows between the power supply VDD and the voltage output nodes NVA and NVB into voltage. The current/voltage conversion elements need not be formed by the transistors TR5A and TR5B (load transistors), but may be formed by other circuit elements such as resistors.

The current/voltage conversion circuit 90 includes a resistor RA provided between the DTO+ signal line and the input node NIA, and a resistor RB provided between the DTO− signal line and the input node NIB. The resistors RA and RB are resistors for impedance matching. The current/voltage conversion circuit 90 may have a configuration in which the resistors RA and RB are omitted.

The output signal from the comparator 100 is input to a level shifter 102, and the voltage level is converted (from 2.8 V to 1.8 V, for example). The inversion output signal from the level shifter 102 is input to a serial/parallel conversion circuit 104. The inversion output signal (negative logic) from the comparator 100 may be input to the level shifter 102, and the output signal (positive logic) from the level shifter 102 may be input to the serial/parallel conversion circuit 104.

The serial/parallel conversion circuit 104 converts the serial data from the comparator 100 into parallel data. The parallel data output from the serial/parallel conversion circuit 104 is stored in a FIFO, and output to a higher layer circuit in the subsequent stage (layer higher than the physical layer).

The power-down detection circuit 110 detects the power-down command based on the parallel data (parallel signal) from the serial/parallel conversion circuit 104. In more detail, the power-down detection circuit 110 detects the power-down command included in the data transmitted from the transmitter circuit in the normal transfer mode. The power-down detection circuit 110 may directly detect the power-down command from the output signal from the comparator 100.

The power-down detection circuit 110 includes a command decoder 112 and a power-down pulse generation circuit 114. The command decoder 112 detects the power-down command by the decode processing. When the transmitter circuit transmits a special code generated by using an encoding method (8B/10B encoding, for example) which expands the bit width as the power-down command, the power-down detection circuit 110 detects the special code to which the power-down command is assigned by decode processing of the command decoder 112. The power-down pulse generation circuit 114 generates a power-down pulse signal PDPLS when the power-down command is detected. The power-down pulse generation circuit 114 also performs processing of adjusting the generation timing of the signal PDPLS.

The power-down setting circuit 120 includes a holding circuit 122, a delay circuit 124, and level shifters 126 and 128. The power-down setting circuit 120 may have a configuration in which some of these circuit blocks are omitted.

The holding circuit 122 holds power-down setting information (power-down setting flag) when the power-down command is detected until the power-down mode is canceled. In more detail, the holding circuit 122 is set when the signal PDPLS becomes active (L level), whereby the logic "1" (power-down setting information) is held. The holding circuit 122 may be implemented by an RS flip-flop with a reset terminal and a set terminal or the like.

The output signal from the holding circuit 112 is input to the delay circuit 124, and delay processing of the signal is performed. The output signal from the delay circuit 124 is input to the level shifter 126, and the voltage level is converted (from 1.8 V to 2.8 V). A positive logic power-down signal PD, which is the output signal from the level shifter 126, is input to an enable terminal XEN (negative logic) of the comparator 100 and an enable terminal EN (positive logic) of the wakeup detection circuit 130. A negative logic power-down signal XPD, which is the inversion output signal from the level shifter 126, is input to the gate terminals of the transistors TR3A and TR3B.

The wakeup detection circuit 130 (wakeup detection buffer) is a circuit which detects the wakeup voltage when the transmitter circuit outputs the wakeup voltage to the differential signal lines. The wakeup detection circuit 130 operates at the CMOS voltage level, and detects the wakeup voltage at the CMOS voltage level. In FIG. 3, the wakeup detection circuit 130 is connected to the DTO+ signal line. However, the wakeup detection circuit 130 may be connected to the DTO− signal line, or may be connected to both the DTO+ and DTO− signal lines.

Since the signal PD is set at the L level in the normal transfer mode, the comparator 100 is set to the enabled state and the wakeup detection circuit 130 is set to the disabled state. Since the signal XPD is set at the H level, the transistors TR3A and TR3B are turned ON. Since the signal PD is set at the H level when the power-down command is detected, the comparator 100 is set to the disabled state and set to the power-down mode (mode in which the operating current is terminated or limited), and the wakeup detection circuit 130 is set to the enabled state. Since the signal XPD is set at the L level, the transistors TR3A and TR3B are turned OFF, whereby the current/voltage conversion circuit 90 is set to the power-down mode.

When the voltage output circuit 72 outputs the wakeup voltage at the L level in the power-down mode, the wakeup detection circuit 128 set to the enabled state detects the wakeup voltage, and outputs a signal XWUPPLS which is a signal for canceling the power-down mode. The holding circuit 122 is reset when the pulse signal XWUPPLS at the L level from the wakeup detection circuit 128 is input to a reset terminal of the holding circuit 122 through the level shifter 128. This causes the power-down setting information (logic "1") to be cleared, whereby the power-down mode is canceled.

Figure 4:
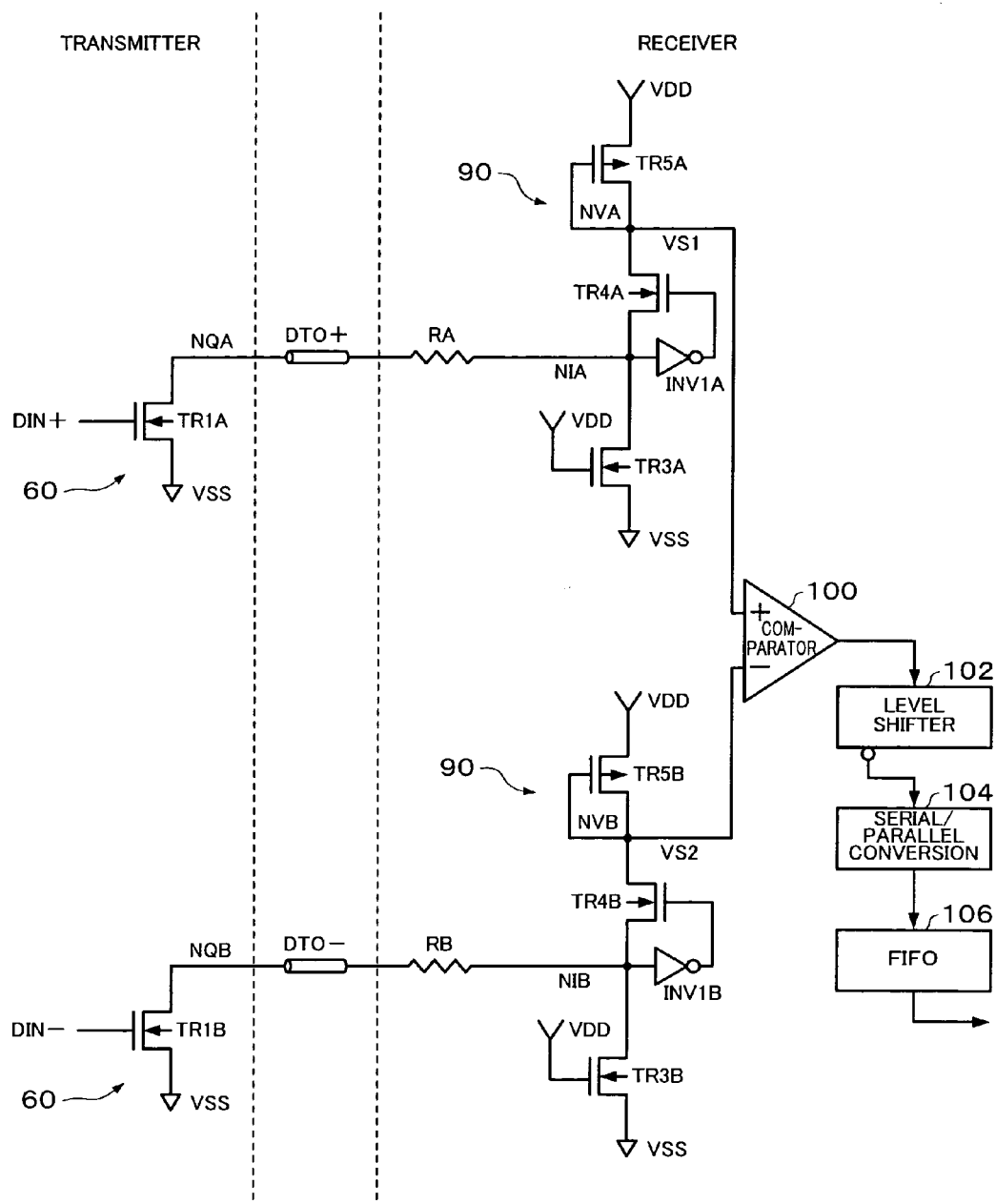
FIG. 4 is a comparative example of a transmitter circuit and a receiver circuit.

FIG. 4 shows a configuration of the transmitter circuit and the receiver circuit, in which the voltage driver 70, the power-down detection circuit 110, and the power-down setting circuit 120 are not provided, as a comparative example.

4. Operation

Figure 5:
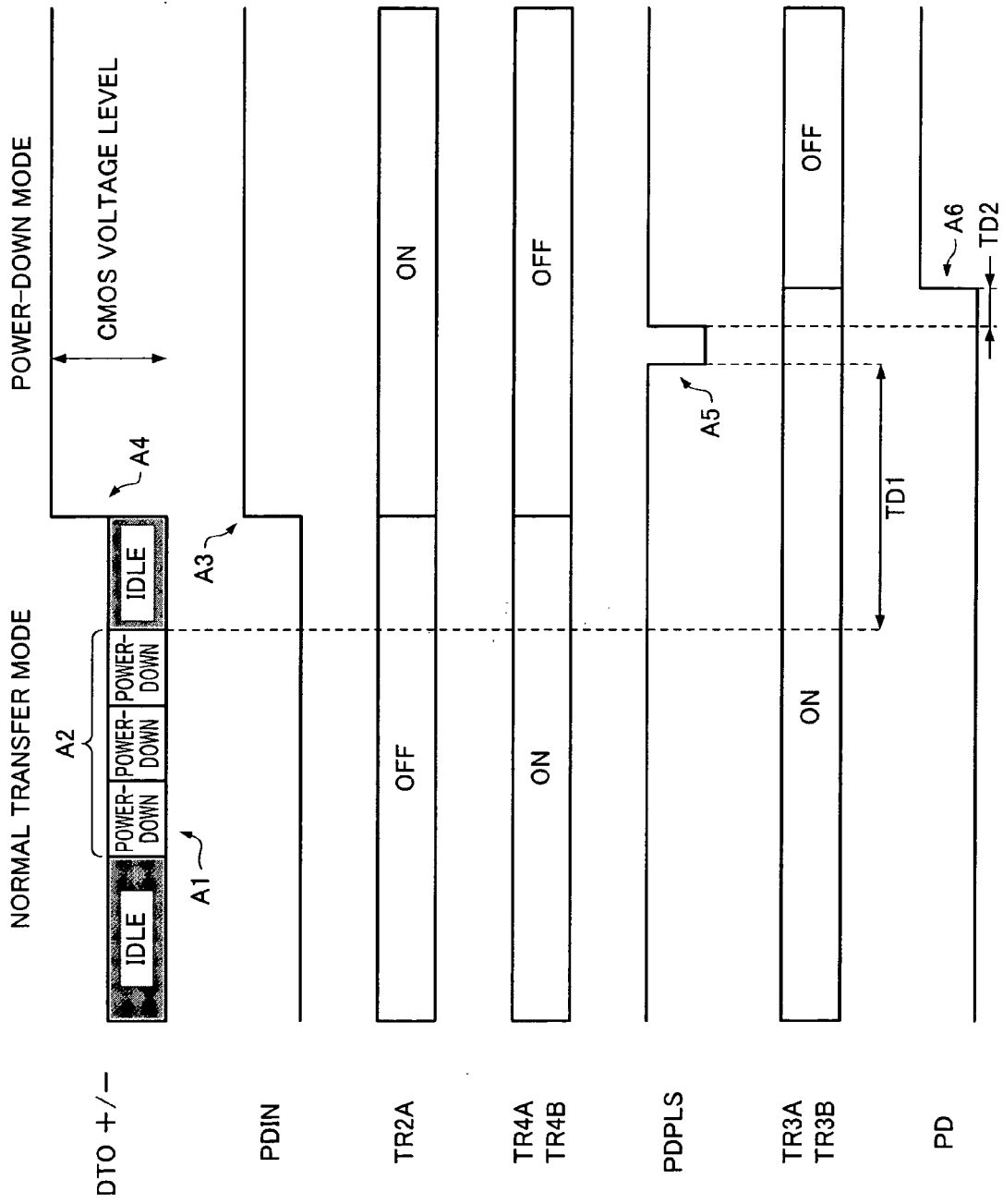
FIG. 5 is a waveform chart for illustrating an operation in the first configuration example.

The operation in the first configuration example shown in FIG. 3 is described below using waveform charts shown in FIGS. 5 and 6. The operation in the normal transfer mode is described below. As shown in FIG. 5, since the signal PDIN is set at the L level in the normal transfer mode, the transistor TR2A is in the OFF state. Since the power-down signal PD is set at the L level, the transistors TR3A and TR3B are in the ON state. The voltage driver 70 is electrically disconnected from the differential signal lines when the transistor TR2A is turned OFF. A normal operating current flows through the current/voltage conversion circuit 90 when the transistors TR3A and TR3B are turned ON, whereby the normal transfer can be implemented. Specifically, the configuration shown in FIG. 3 becomes equivalent to the configuration shown in FIG. 4.

In the normal transfer mode, the transmitter circuit and the receiver circuit operate as described below. When the transistors TR1A and TR1B are in the OFF state, the input nodes NIA and NIB are set at a voltage of about 1 V, for example. When the transistor TR1A on the side of the DTO+ signal line is turned ON, current flows toward the power supply VSS (GND) through the differential signal lines. This causes the voltage of the input node NIA to be decreased to only a small extent. As a result, the voltage of the input node NIA is reversed by the inverter circuit INV1A and the output voltage of the inverter circuit INV1A is increased, whereby the ON-resistance of the transistor TR4A is decreased. This increases the amount of current which flows through the transistor TR5A. Therefore, the voltage difference between the power supply VDD and the voltage output node NVA (voltage between the drain and source of the transistor TR5A) is increased, whereby the voltage of the voltage output node NVA is decreased. When the transistor TR1B on the side of the DTO− signal line is turned ON, the voltage of the voltage output node NVB is decreased. Therefore, the data "0" or "1" is detected by allowing the comparator 100 to compare and amplify the voltage difference between the voltage output nodes NVA and NVB.

The operation during power-down command transmission is described below. At A1 shown in FIG. 5, the transmitter circuit transmits the power-down command to the receiver circuit. In this embodiment, since the power-down command is transmitted in the normal transfer mode in which the differential signal lines are current-driven, it is unnecessary to provide an extra signal line.

As indicated by A2 in FIG. 5, the transmitter circuit may transmit a plurality of power-down commands by current-driving the differential signal lines. The power-down setting circuit 120 may set the current/voltage conversion circuit 90 and the comparator 100 in the power-down mode on condition that a plurality of power-down commands are detected.

A problem in which the receiver circuit 80 is erroneously set to the power-down mode can be prevented, even when a transfer error occurs, by transmitting and detecting a plurality of power-down commands. Specifically, if the receiver circuit 80 is erroneously set to the power-down mode, it is difficult for the receiver circuit 80 to recover from the power-down mode. However, such a problem can be prevented by transmitting and detecting a plurality of power-down commands.

The operation at the time of power-down setting is described below. As indicated by A3 shown in FIG. 5, the transistor TR2A is turned ON when the signal PDIN is set at the H level, whereby the voltage driver 70 is electrically connected to the differential signal lines. The voltage driver 70 outputs a voltage at the H level of the CMOS voltage level to the differential signal lines as indicated by A4, whereby the transistor TR4A is turned OFF. An unnecessary current can be prevented from flowing through the path from the transistor TR5A to the voltage output circuit 72 through the transistor TR4A, the DTO+ signal line, and the transistor TR2A by causing the transistor TR4A to be turned OFF, whereby power consumption can be reduced.

When the transmitter circuit transmits the power-down command, a power-down pulse signal PDPLS becomes active (L level) after the period TD1 has elapsed as indicated by A5 shown in FIG. 5. The period TD1 can be adjusted by the power-down pulse generation circuit 114. The logic "1" is set in the holding circuit 122 when the signal PDPLS becomes active. As indicated by A6, the power-down signal PD becomes active after the period TD2 has elapsed. The period TD2 can be adjusted by the delay circuit 124.

When the signal PD becomes active, the transistors TR3A and TR3B are turned OFF, and the comparator 100 is set to the disabled state. Therefore, the operating current which constantly flows through the current/voltage conversion circuit 90 and the comparator 100 can be cut, whereby power consumption can be reduced. Moreover, since the wakeup detection circuit 130 is set to the enabled state, the wakeup voltage output to the differential signal lines can be detected.

The operation at the time of power-down cancellation is described below using FIG. 6. As indicated by B1 shown in FIG. 6, a voltage at the H level of the CMOS voltage level is output to the DTO+ (or DTO−) signal line in the power-down mode. When canceling the power-down mode, the voltage output circuit 72 outputs the wakeup voltage at the L level of the CMOS voltage level to the DTO+ signal line as indicated by B2. The signal PDIN is set at the L level after the period TD3 has elapsed, whereby the transistor TR2A is turned OFF and the voltage output circuit 72 is disconnected from the DTO+ signal line.

When the wakeup voltage is output, the wakeup detection circuit 130 set to the enabled state detects the wakeup voltage, and sets the signal XWUPPLS at the L level as indicated by B4. This causes the holding circuit 122 to be reset to the logic "0", and the power-down signal PD is set at the L level after the period TD4 has elapsed, as indicated by B5. This causes the transistors TR3A and TR3B to be turned ON and the comparator 100 to be set to the enabled state, whereby the power-down mode is canceled. The wakeup detection circuit 130 is set to the disabled state. As indicated by B6, the differential signal lines are set to the idle state after an undefined period, whereby the normal transfer can be enabled.

5. Transmission of Power-Down Command Using Special Code

In this embodiment, encoding circuits 11 and 31 may be respectively provided in the host device 10 and the target device 30 (transmitter circuit), as shown in FIG. 7A. The encoding circuits 11 and 31 encode the data using an encoding method which expands the bit width, for example. As the encoding method, an 8B/10B encoding method in which 8-bit data is converted into 10-bit data can be given, for example. According to the 8B/10B encoding method, even if the data continuously contains "0" or "1", a change in bits of the signal is increased after encoding as shown in FIG. 7B, whereby occurrence of transfer errors due to noise or the like can be reduced. According to the 8B/10B encoding method, since the bit width is expanded from 8 bits to 10 bits, a special code (similar to control code) shown in FIG. 7C can be transmitted in addition to data.

In this embodiment, the power-down command is assigned to the special code and transmitted, as shown in FIG. 7A. The power-down command is detected by detecting the special code to which the power-down command is assigned by the decode processing of the command decoder 112 shown in FIG. 3. Occurrence of transfer errors can be reduced by effectively utilizing the encoding method. Moreover, transmission and detection of the power-down command can be easily implemented by current-driving the differential signal lines. Furthermore, data transfer can be performed by assigning the special code to the start code or the end code of a packet.

It suffices that the encoding method performed by the encoding circuit 11 and 31 be encoding which expands the bit width, and the encoding method is not limited to the 8B/10B encoding.

6. Power-Down Mode Setting of Clock Transfer Receiver Circuit

According to this embodiment, the transmitter circuits 22, 24, 46, and 48 can separately set the corresponding receiver circuits 42, 44, 26, and 28 in the power-down mode in FIG. 1. Therefore, the power-down command for setting the clock transfer receiver circuit 44 in the power-down mode or the wakeup voltage for canceling the power-down mode may be transferred through the CLK+/− differential signal lines. The power-down command for setting the strobe transfer (clock transfer in a broad sense) receiver circuit 28 in the power-down mode or the wakeup voltage for canceling the power-down mode may be transferred through the STB+/− differential signal lines.

Figure 8A:
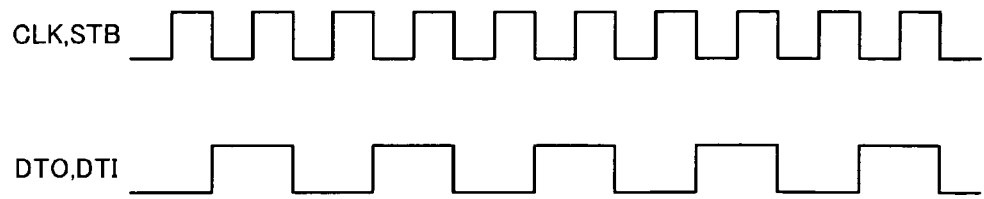
FIGS. 8A and 8B are diagrams for illustrating a method of setting or canceling a clock transfer power-down mode.

However, as shown in FIG. 8A, the frequency (band) of the signals transmitted through the CLK+/− and STB+/− differential signal lines is higher than the frequency of the signals transmitted through the DTO+/− and DTI+/− differential signal lines. Therefore, if the power-down detection circuit, the power-down setting circuit, and the voltage driver described in this embodiment are provided on the side of the CLK+/− and STB+/− differential signal lines, transfer performance such as the transfer rate and transfer reliability may be adversely affected. In particular, if the voltage driver is provided on the side of the CLK+/− and STB+/− differential signal lines, the parasitic capacitance of the drain terminal or the gate terminal of the transistor may be added to the differential signal lines, whereby the transfer performance may be adversely affected.

Figure 8B:
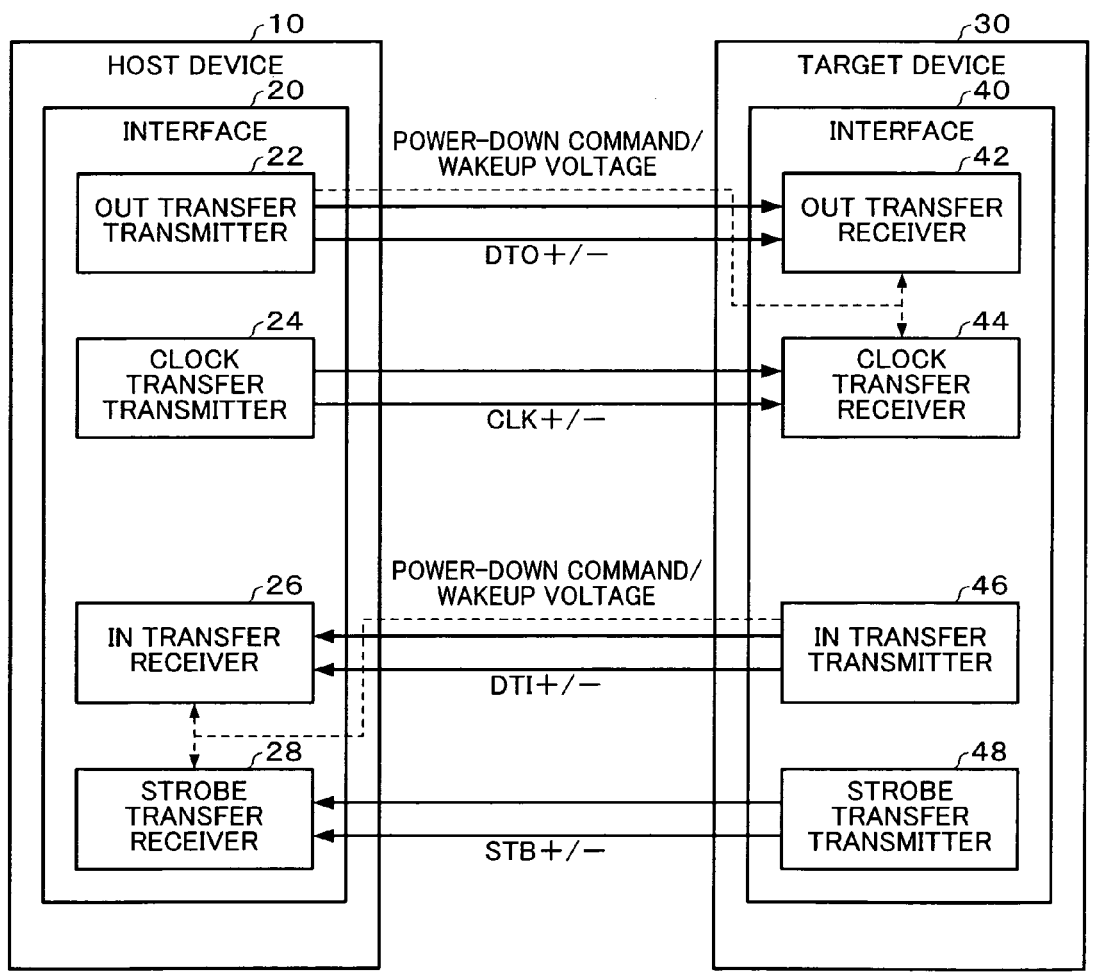

Therefore, in FIG. 8B, the power-down command for setting the clock transfer receiver circuit 44 in the power-down mode (hereinafter called "clock transfer power-down command") and the wakeup voltage for canceling the power-down mode (hereinafter called "clock transfer wakeup voltage") are transmitted through the OUT transfer DTO+/− differential signal lines.

Specifically, when setting the clock transfer receiver circuit 44 in the power-down mode, the OUT transfer transmitter circuit 22 transmits the clock transfer power-down command to the OUT transfer receiver circuit 42 through the DTO+/− differential signal lines. The power-down setting circuit included in the OUT transfer receiver circuit 42 outputs the power-down signal to the clock transfer receiver circuit 44 when the clock transfer power-down command is detected as the power-down command transmitted through the DTO+/− differential signal lines. This causes the current/voltage conversion circuit and the comparator included in the clock transfer receiver circuit 44 to be set to the power-down mode.

When canceling the power-down mode of the clock transfer receiver circuit 44, the OUT transfer transmitter circuit 22 (voltage driver) outputs the wakeup voltage to the DTO+/− differential signal lines. When the wakeup detection circuit included in the OUT transfer receiver circuit 42 detects the wakeup voltage from the OUT transfer transmitter circuit 22, the wakeup detection circuit outputs a signal for canceling the power-down mode of the OUT transfer receiver circuit 42 and the clock transfer receiver circuit 44.

The above-described configuration makes it unnecessary to transmit the power-down command or the wakeup voltage through the CLK+/− differential signal lines. Therefore, the transfer performance of the clock transfer performed through the CLK+/− differential signal lines can be prevented from being adversely affected.

The power-down command for setting the strobe transfer receiver circuit 26 in the power-down mode or the wakeup voltage for canceling the power-down mode may be transferred through the IN transfer DTI+/− differential signal lines. The power-down command for setting the clock transfer receiver circuit in the power-down mode and the power-down command for setting the data transfer receiver circuit in the power-down mode may be commands in different codes or commands in the same code.

7. Details of Power-Down Control

Figure 10:
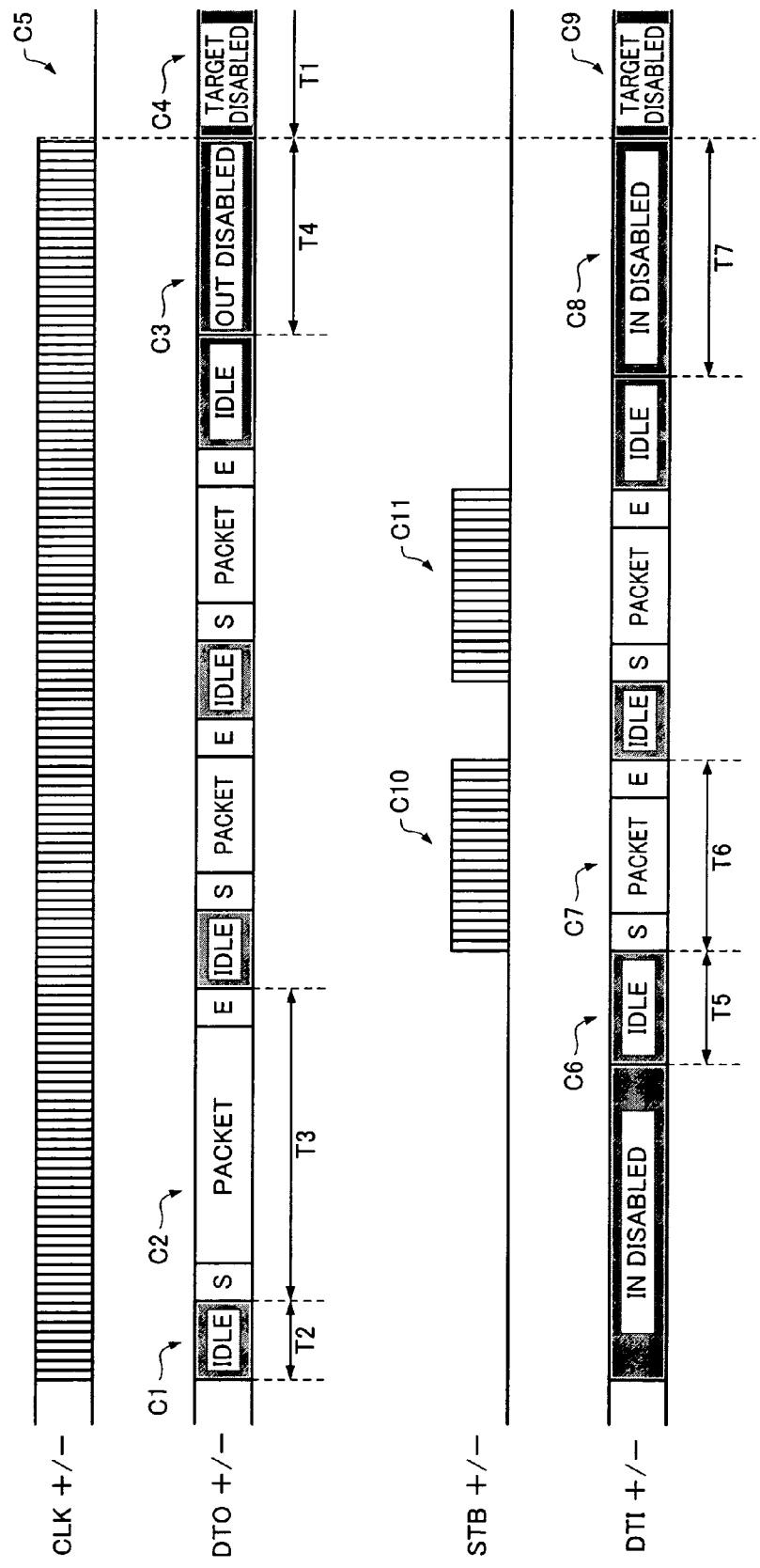
FIG. 10 is a diagram for describing a power-down control method according to one embodiment of the present invention.

The details of the power-down control are described below. In this embodiment, various states are defined as shown in FIGS. 9 and 10. In FIGS. 9 and 10, a device disabled state is a state in which the entire electronic instrument (host device and target device) is set to the power-down mode. A target disabled state (period T1) is a state in which the supply of the clock signal from the host device to the target device is terminated and all the functions of the target device are stopped. The supply of the clock signal is terminated after the device has entered the target disabled state.

An OUT idle state (period T2) is the idle state of the OUT transfer (transfer from the host device to the target device) (state between packet transfers). In the OUT idle state, since the host-side transmitter circuit and the target-side receiver circuit are not set to the power-down mode, the normal transfer can be immediately performed. Since current constantly flows through these circuits, electric power is consumed. An OUT transfer state (period T3) is a state in which the OUT transfer is performed.

An OUT disabled state (period T4) is a state in which the OUT transfer is terminated. In this state, the current which has been constantly flowing through the host-side transmitter circuit and the target-side receiver circuit is terminated by the power-down mode, whereby a reduction of power consumption is implemented. The power-down mode can be canceled by allowing the host-side transmitter circuit to output the wakeup voltage to the target-side receiver circuit, whereby the transfer which has been terminated can be resumed.

An IN idle state (period T5) is an idle state of the IN transfer (transfer from the target device to the host device). In the IN idle state, since the target-side transmitter circuit and the host-side receiver circuit are not set to the power-down mode, the normal transfer can be immediately performed. Since current constantly flows through these circuits, electric power is consumed. An IN transfer state (period T6) is a state in which the IN transfer is performed.

An IN disabled state (period T7) is a state in which the IN transfer is terminated. In this state, the current which has been constantly flowing through the target-side transmitter circuit and the host-side receiver circuit is terminated by the power-down mode, whereby a reduction of power consumption is implemented. The power-down mode can be canceled by allowing the target-side transmitter circuit to output the wakeup voltage to the host-side receiver circuit, whereby the transfer which has been terminated can be resumed.

In FIG. 9, a "host function" indicates the system function of the host, a "target CLKIN" indicates the presence or absence of the clock input to the target device, and a "target function" indicates the system function of the target. A "DTO transmission" indicates the DTO+/− transmission function of the host, and a "DTI reception" indicates the DTI+/− reception function of the host. A "DTI transmission" indicates the DTI+/− transmission function of the target, and a "DTO reception" indicates the DTO+/− reception function of the target. A "CLK transmission" indicates the CLK+/− transmission function, and a "CLK reception" indicates the CLK+/− reception function. In FIG. 9, a symbol "○" indicates that these functions are in the enabled state (operating state), and a symbol "×" indicates that these functions are in the disabled state (power-down state). A symbol "−" indicates "don't care". In FIG. 10, "S" indicates the start code of packet transfer, and "E" indicates the end code of packet transfer. The start code and the end code are generated by using 8B/10B encoding, for example.

The OUT transfer is in the idle state at C1 shown in FIG. 10, and a packet is transferred by the OUT transfer at C2. In the OUT disabled state at C3, the host-side transmitter circuit and the target-side receiver circuit are set to the power-down mode. In the target disabled state at C4, the supply of the clock signals CLK+/− is terminated as indicated by C5, whereby all the functions of the target device are terminated.

The IN transfer is in the idle state at C6 shown in FIG. 10, and a packet is transferred by the IN transfer at C7. In the IN disabled state at C8, the target-side transmitter circuit and the host-side receiver circuit are set to the power-down mode. The target disabled state occurs at C9. As indicated by C10 and C11, the target supplies the strobes STB+/− to the host only when performing the normal IN transfer.

According to this embodiment, each transmitter circuit can individually set the corresponding receiver circuit in the power-down mode or cancel the power-down mode. Therefore, the setting and cancellation of the power-down mode optimum for each state shown in FIGS. 9 and 10 can be implemented, whereby a more intelligent power-down control can be implemented.

8. Second Configuration Example

Figure 11:
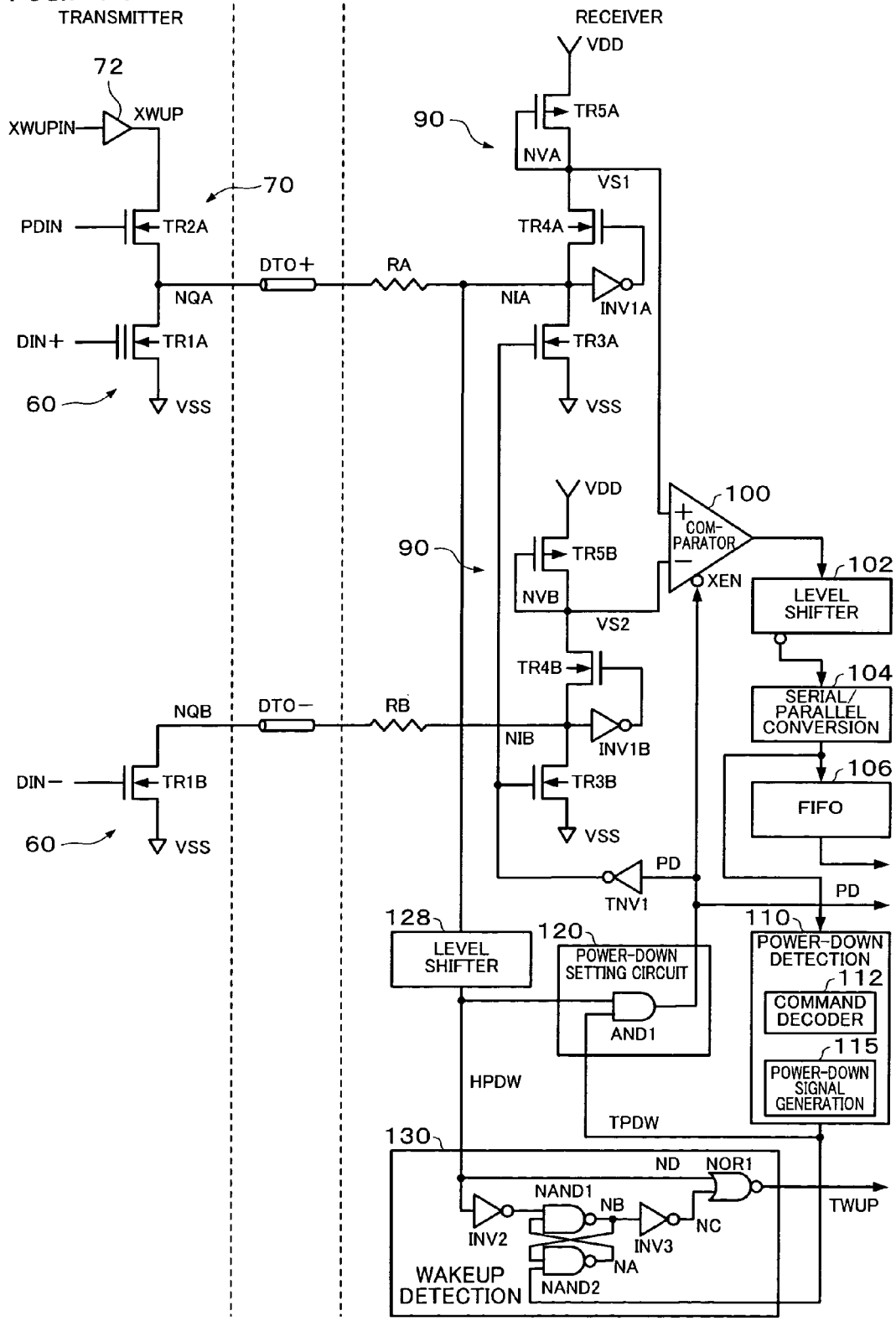
FIG. 11 is a diagram showing a detailed second configuration example of a transmitter circuit and a receiver circuit according to one embodiment of the present invention.

A detailed second configuration example of the transmitter circuit and the receiver circuit in this embodiment is described below using FIG. 11. In FIG. 11, the configuration and operation of the circuit block denoted by the same symbol as in FIG. 3 are almost the same as those in the first configuration example shown in FIG. 3. Therefore, description thereof is omitted.

In FIG. 11, the power-down detection circuit 110 includes the command decoder 112 and a power-down signal generation circuit 115. The command decoder 112 detects the power-down command by the decode processing. The power-down signal generation circuit 115 outputs a target side power-down signal TPDW at the H level (active) when the power-down command is detected.

When the power-down command is detected by the power-down detection circuit 110 and the transmitter circuit outputs the power-down voltage to the differential signal lines (DTO+ or DTO−), the power-down setting circuit 120 sets the current/voltage conversion circuit 90 and the comparator 100 in the power-down mode. In more detail, the power-down setting circuit 120 includes an AND circuit AND1. When the target-side power-down signal TPDW from the power-down signal generation circuit 115 and a host-side power-down signal HPDW, of which the voltage level changes corresponding to the state of the differential signal lines, are set at the H level (active), the power-down setting circuit 120 outputs the power-down signal PD at the H level (active). When the power-down signal PD is set at the H level, the comparator 100 is set to the disabled state and the transistors TR3A and TR3B are turned OFF, whereby the receiver circuit is set to the power-down mode.

The wakeup detection circuit 130 detects cancellation of the power-down mode and outputs the wakeup signal TWUP. In more detail, when the wakeup detection circuit 130 detects cancellation of the power-down mode after the receiver circuit has been set to the power-down mode by the power-down voltage output to the differential signal lines from the transmitter circuit, the wakeup detection circuit 130 outputs the wakeup signal TWUP at the H level (active). When the wakeup signal TWUP is set at the H level, the logic circuit in the subsequent stage (circuit in a layer higher than the physical layer) is awakened.

The operation in the second configuration example shown in FIG. 11 is described below using waveform charts shown in FIGS. 12 and 13. When the transmitter circuit transmits the power-down command to the receiver circuit as indicated by D1 shown in FIG. 12, the power-down detection circuit 110 detects the power-down command. When the power-down command is detected, the power-down signal generation circuit 115 outputs the signal TPDW at the H level as indicated by D2.

The transistor TR2A of the transmitter circuit is turned ON when the signal PDIN is set at the H level, whereby the voltage driver 70 is electrically connected to the differential signal lines. When the voltage driver 70 outputs the power-down voltage at the H level of the CMOS voltage level to the differential signal lines as indicated by D3 shown in FIG. 12, the signal HPDW is set at the H level (active) as indicated by D4. Since both the signals HPDW and TPDW are set at the H level, the power-down signal PD output from the power-down setting circuit 120 is set at the H level as indicated by D5. When the signal PD is set at the H level (active), the comparator 100 is set to the disabled state and the transistors TR3A and TR3B are turned OFF, whereby the receiver circuit is set to the power-down mode.

As described with reference to FIGS. 8A and 8B, when the signal PD is set at the H level and the data transfer receiver circuits (42, 26) are set to the power-down mode, it is preferable to set the clock transfer receiver circuits (44, 28) in the power-down mode. When the power-down mode of the data transfer receiver circuits is canceled, it is preferable to cancel the power-down mode of the clock transfer receiver circuits. In this case, the data transfer receiver circuit outputs the signal PD to the clock transfer receiver circuit, and the power-down mode of the clock transfer receiver circuit is set or cancelled based on the signal PD.

Figure 12:
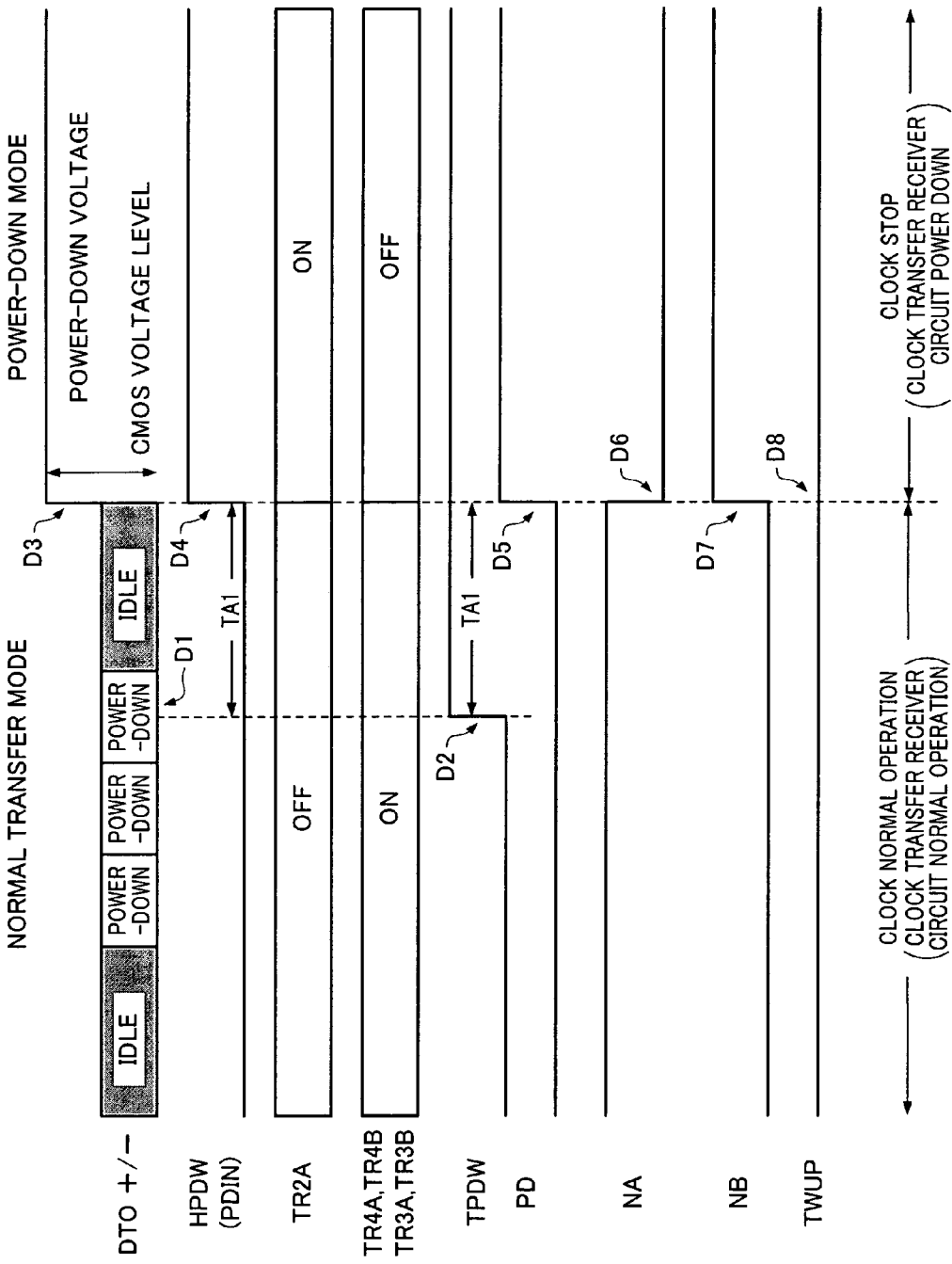
FIG. 12 is a waveform chart for illustrating an operation in the second configuration example.

When the signal HPDW is set at the H level, the output nodes NA and NB of the RS flip circuits (NAND1, NAND2) included in the wakeup detection circuit 130 are respectively set at the L level and the H level, as indicated by D6 and D7 shown in FIG. 12. In this case, since the node ND of the signal HPDW is at the H level, the wakeup signal TWUP output from the wakeup detection circuit 130 remains at the L level (inactive) as indicated by D8.

Figure 13:
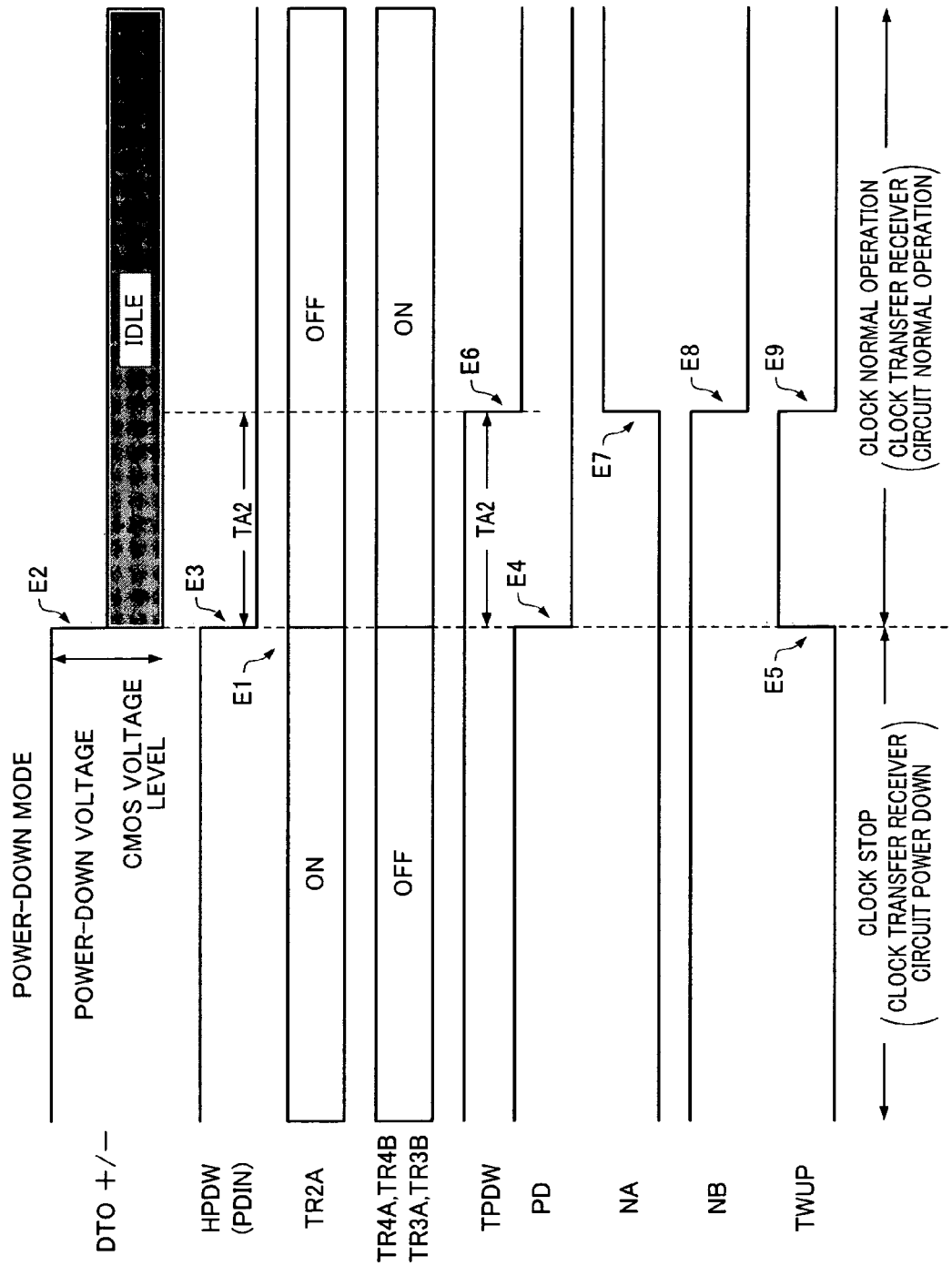
FIG. 13 is another waveform chart for illustrating an operation in the second configuration example.

The signal PDIN is then set at the L level, whereby the transistor TR2A is turned OFF as indicated by E1 shown in FIG. 13. This causes the supply of the power-down voltage to the differential signal lines to be terminated and the power-down mode to be canceled, whereby the differential signal lines are set to the idle state as indicated by E2. In the idle state, since the transistors TR1A and TR1B of the transmitter circuit are turned OFF, the voltage levels of the differential signal lines are set at a low voltage level of about 1 V, for example. Therefore, the signal HPDW is set at the L level as indicated by E3, and the power-down signal PD is set at the L level (inactive) as indicated by E4. This causes the comparator 100 to be set to the enabled state and the transistors TR3A and TR3B to be turned ON, whereby the power-down mode of the receiver circuit is canceled. As described with reference to FIGS. 8A and 8B, the power-down mode of the clock transfer receiver circuits (44, 28) is also canceled.

The signal HPDW may be set at the L level by causing the transistors TR1A and TR1B to be turned ON after the transistor TR2A has been turned OFF. The signal HPDW may be set at the L level by causing the transistor TR2A to be turned ON for a predetermined period and allowing the voltage output circuit 72 to output a voltage at the L level in the predetermined period.

When the node ND of the signal HPDW is set at the L level, since the node NB and the node NC of the wakeup detection circuit 130 are respectively set at the H level and the L level, the wakeup signal TWUP is set at the H level as indicated by E5 shown in FIG. 13. The logic circuit in the subsequent stage (circuit in a layer higher than the physical layer) is awakened by being triggered by the wakeup signal TWUP set at the H level. When the signal TWUP is set at the H level, the power-down signal generation circuit 115 sets the signal TPDW at the L level after a predetermined period has elapsed as indicated by E6. This causes the voltages of the nodes NA and NB to be respectively set at the H level and the L level as indicated by E7 and E8, and the wakeup signal TWUP returns to the L level.

The difference between the first configuration example described with reference to FIGS. 3, 5, and 6 and the second configuration example described with reference to FIGS. 11 to 13 is described below.

In the first configuration example, the pulse signal PDPLS is set at the L level after the period TD1 has elapsed after detection of the power-down command as indicated by A5 shown in FIG. 5. This causes the signal PD to be set at the H level as indicated by A6, whereby the receiver circuit is set to the power-down mode.

In the second configuration example, when the power-down command is detected and the signal TPDW is set at the H level as indicated by D1 and D2 shown in FIG. 12, and the transmitter circuit outputs the power-down voltage at the H level to the differential signal lines as indicated by D3 and D4, the signal PD is set at the H level as indicated by D5, whereby the receiver circuit is set to the power-down mode.

Figure 6:
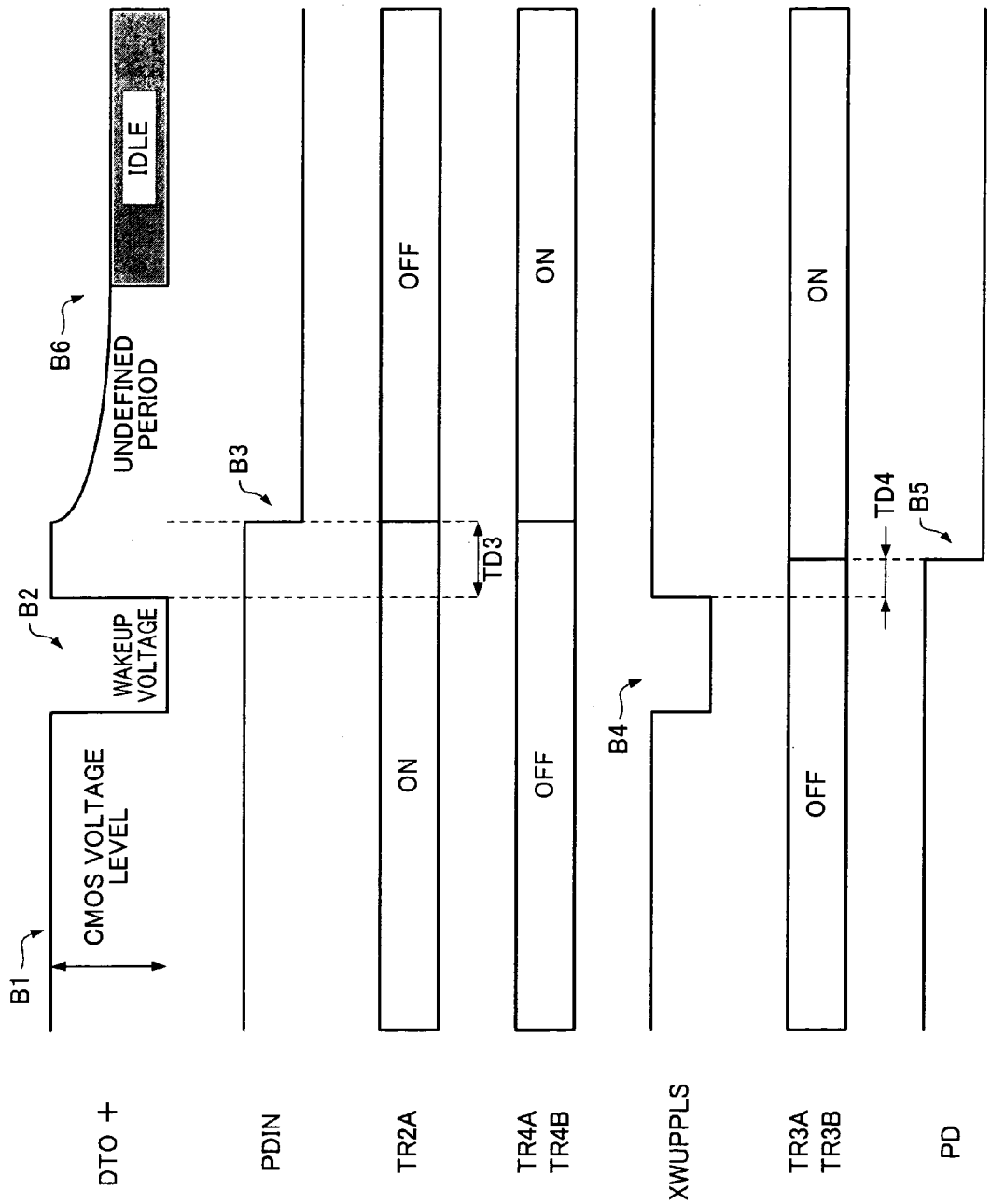
FIG. 6 is another waveform chart for illustrating an operation in the first configuration example.

In the first configuration example, when the transmitter circuit outputs the wakeup voltage at the L level as indicated by B2 shown in FIG. 6, the signal PD is set at the L level as indicated by B5, whereby the power-down mode of the receiver circuit is canceled.

In the second configuration example, when the supply of the power-down voltage to the differential signal lines by the transmitter circuit is terminated as indicated by E2 shown in FIG. 13, the signal PD is set at the L level as indicated by E4, whereby the power-down mode of the receiver circuit is canceled. The wakeup signal TWUP is then set at the H level as indicated by E5, whereby the higher layer logic circuit in the subsequent stage is awakened.

Specifically, in the first configuration example, the power-down mode is set merely on condition that the power-down command is detected. Therefore, the delay circuit for setting up the periods TD1 and TD2 shown in FIG. 5 is necessary. This is because the holding circuit 122 shown in FIG. 3 is reset if the timing at which the differential signal lines are set at the H level indicated by A4 shown in FIG. 5 is later than the timing at which the pulse signal PDPLS is set at the L level indicated by A5, whereby the power-down mode is canceled. Since the transmitter circuit cannot know the signal delay state of the receiver circuit, the timing adjustment becomes complicated if such a delay circuit is provided, whereby the sequence design becomes difficult.

In the second configuration example, the power-down mode is not set even if the power-down command is merely detected as indicated by D2 shown in FIG. 12, and the power-down mode is set on condition that the transmitter circuit outputs the power-down voltage after the power-down command has been detected as indicated by D3 and D4. Specifically, preparations for transition to the power-down mode are made on condition that the power-down command is detected, and the transition to the power-down mode occurs on condition that the output of the power-down voltage is detected. This makes it unnecessary to provide a delay circuit, which is necessary in the first configuration example, whereby the timing adjustment can be simplified and the sequence design can be facilitated.

In the second configuration example, the wakeup signal TWUP must remain at the L level at the timing indicated by D8 shown in FIG. 12, and the wakeup signal TWUP must be set at the H level at the timing indicated by E8 shown in FIG. 13. However, the signal HPDW is set at the L level and the signal TPDW is set at the H level in the period TA1 shown in FIG. 12 and the period TA2 shown in FIG. 13. Specifically, the signal state is the same in the period TA1 and the period TA2. Since the clock signal is terminated in the period between the timing indicated by D8 shown in FIG. 12 and the timing indicated by E5 shown in FIG. 13, the period TA1 and the period TA2 must be distinguished only by the signal state.

Therefore, in the second configuration example, the wakeup detection circuit 130 having the configuration shown in FIG. 11 is provided. Specifically, in the second configuration example, the period TA1 shown in FIG. 12 and the period TA2 shown in FIG. 13 can be distinguished by allowing the RS flip-flop circuits (NAND1, NAND2) of the wakeup detection circuit 130 to hold the voltage states of the nodes NA and NB. As described above, the wakeup detection circuit 130 is a circuit which sets the wakeup signal TWUP at the H level (active) when the voltage level of the differential signal lines changes from the power-down voltage (H level, for example) to another voltage level (1 V, for example) (when the signal HPDW changes from the H level to the L level) after the power-down command has been detected and the output signal TPDW from the power-down detection circuit 110 has been set at the H level (active). This circuit prevents the wakeup signal TWUP from being set at the H level at the timing indicated by D8 shown in FIG. 12 and causes the wakeup signal TWUP to be set at the H level at the timing indicated by E5 shown in FIG. 13.

9. Third Configuration Example

Figure 14:
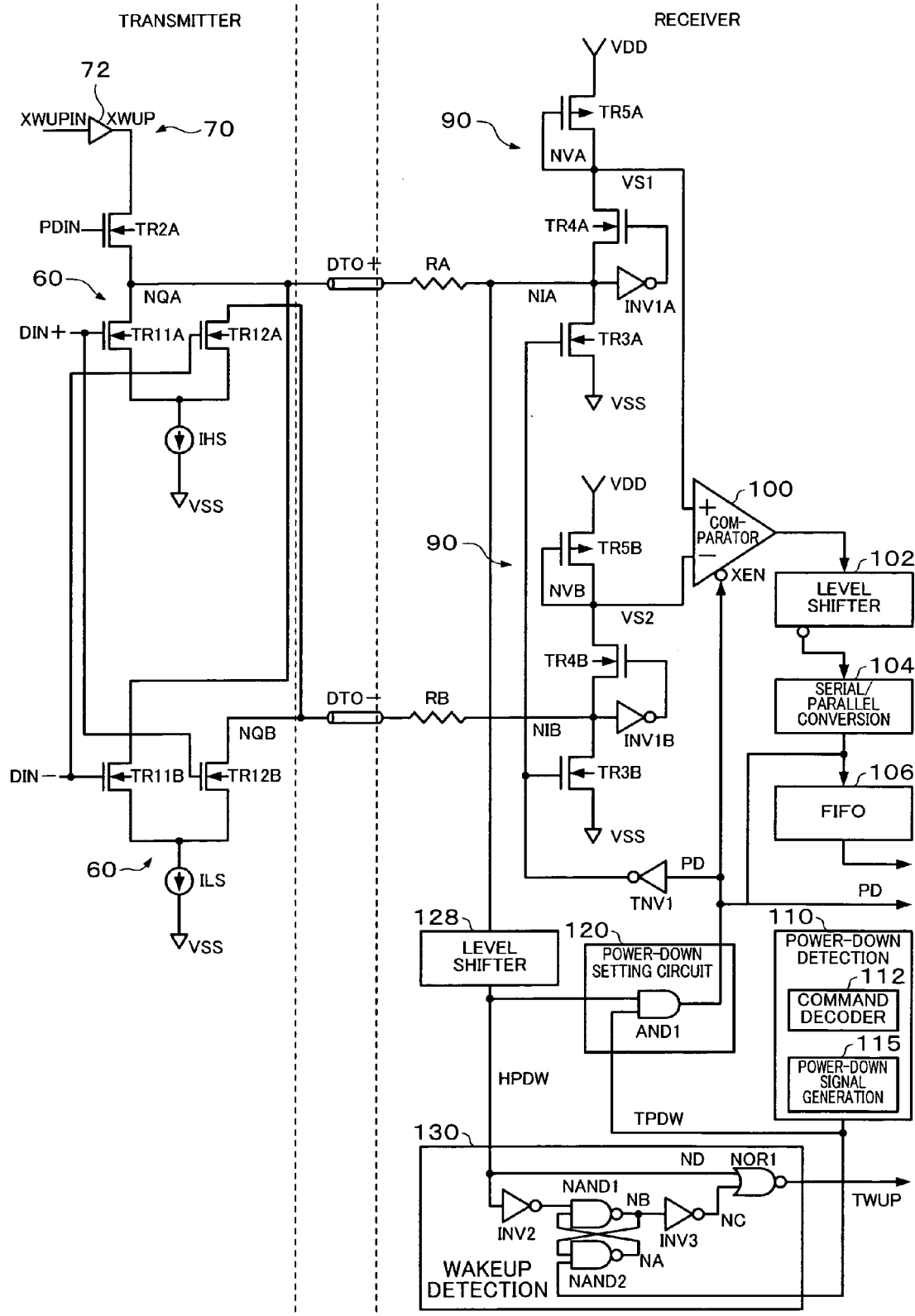
FIG. 14 is a diagram showing a detailed third configuration example of a transmitter circuit and a receiver circuit according to one embodiment of the present invention.

A detailed third configuration example of the transmitter circuit and the receiver circuit according to one embodiment of the present invention is described below using FIG. 14. In FIG. 14, the configuration and operation of the circuit block denoted by the same symbol as in FIGS. 3 and 11 are almost the same as those in the first and second configuration examples shown in FIGS. 3 and 11. Therefore, description thereof is omitted.

The third configuration example shown in FIG. 14 differs from the second configuration example shown in FIG. 11 in the configuration of the transmitter circuit. In more detail, in FIG. 14, the current driver 60 (first and second current sources) of the transmitter circuit includes N-type (first conductivity type) transistors TR11A and TR12A and a current source IHS. The current driver 60 includes N-type (first conductivity type) transistors TR11B and TR12B and a current source ILS.

The transistor TR11A is provided between the output node NQA and the current source IHS. In more detail, the input signal DIN+ is input to a gate terminal of the transistor TR11A, the output node NQA is connected to a drain terminal of the transistor TR11A, and the current source IHS is connected to a source terminal of the transistor TR11A. The transistor TR12A is provided between the output node NQB and the current source IHS. In more detail, the input signal DIN– is input to a gate terminal of the transistor TR12A, the output node NQB is connected to a drain terminal of the transistor TR12A, and the current source IHS is connected to a source terminal of the transistor TR12A.

The transistor TR11B is provided between the output node NQA and the current source ILS. In more detail, the input signal DIN– is input to a gate terminal of the transistor TR11B, the output node NQA is connected to a drain terminal of the transistor TR11B, and the current source ILS is connected to a source terminal of the transistor TR11B. The transistor TR12B is provided between the output node NQB and the current source ILS. In more detail, the input signal DIN– is input to a gate terminal of the transistor TR12B, the output node NQB is connected to a drain terminal of the transistor TR12B, and the current source ILS is connected to a source terminal of the transistor TR12B.

The current source IHS is provided between the transistors TR11A and TR12A and the power supply VSS (first power supply). The current source IHS is a current source which can generate current (500 µA, for example) greater than that of the current source ILS, and may be formed by a transistor to which a first reference voltage is input at a gate terminal, for example.

The current source ILS is provided between the transistors TR11B and TR12B and the power supply VSS (first power supply). The current source ILS is a current source which can generate current (100 µA, for example) smaller than that of the current source IHS, and may be formed by a transistor to which a second reference voltage lower than the first reference voltage is input at a gate terminal, for example.

When the input signal DIN+ becomes active (H level) and the input signal DIN– becomes inactive (L level), the transistors TR11A and TR12B are turned ON and the transistors TR12A and TR11B are turned OFF. This causes a large amount of current (500 µA, for example) to flow through the DTO+ signal line and a small amount of current (100 µA, for example) to flow through the DTO– signal line. When the input signal DIN+ becomes inactive (L level) and the input signal DIN– becomes active (H level), the transistors TR11A and TR12B are turned OFF and the transistors TR12A and TR11B are turned ON. This causes a small amount of current to flow through the DTO+ signal line and a large amount of current to flow through the DTO– signal line.

Figure 15A:
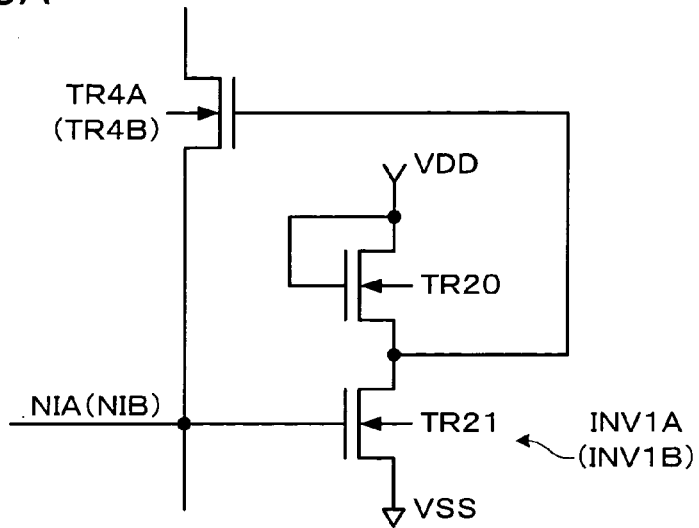
FIGS. 15A, 15B, and 15C are detailed examples of an inverter circuit.
Figure 15B:
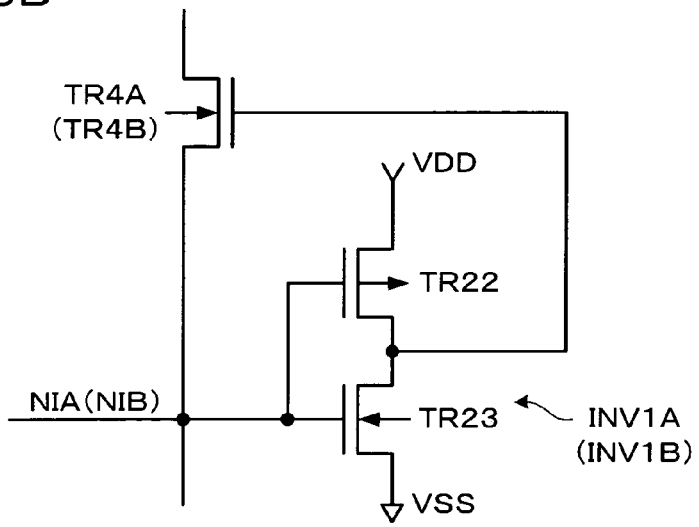
Figure 15C:
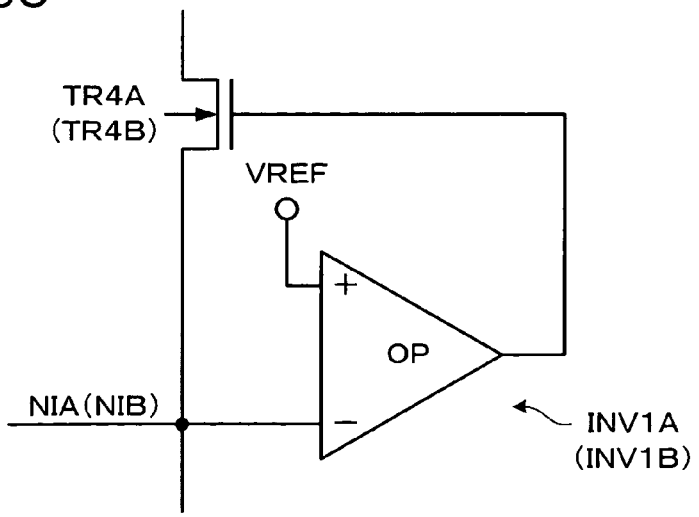

FIGS. 15A, 15B, and 15C show the inverter circuits (inversion circuits) INV1A and INV1B according to one embodiment of the present invention. In FIG. 15A, the inverter circuit INV1A (INV1B) is formed by N-type (first conductivity type) transistors TR20 and TR21 connected in series between the power supply VDD and the power supply VSS. The power supply VDD (second power supply) is connected to a gate terminal of the transistor TR20, and the input node NIA (NIB) is connected to a gate terminal of the transistor TR21. A load resistor may be used instead of the transistor TR20. In FIG. 15B, the inverter circuit INV1A (INV1B) is formed by a P-type (second conductivity type) transistor TR22 and an N-type (first conductivity type) transistor TR23 connected in series between the power supply VDD and the power supply VSS. The input node NIA (NIB) is connected to gate terminals of the transistors TR22 and TR23. In FIG. 15C, the inverter circuit INV1A (INV1B) is formed by an operational amplifier OP. A reference voltage VREF is input to a first input (negative side) of the operational amplifier OP, and the input node NIA (NIB) is connected to a second input (negative side) of the operational amplifier OP.

In FIGS. 3, 11, and 14, the circuit formed by the transistor TR4A (TR4B) and the inverter circuit INV1A (INV1B) functions as a low-impedance generation circuit. A specific impedance (Z0) of the DTO+ (DTO–) differential signal lines can be matched with the input impedance of the receiver circuit by complementing the impedance (Z2) of the resistor RA (RB) to the impedance (Z1) generated by the low-impedance generation circuit (Z0=Z1+Z2). The length of the differential signal lines or the like is changed depending on the type of an electronic instrument, whereby the specific impedance of the differential signal lines may be changed. In this case, it is preferable that the resistor RA (RB) be a variable resistor. This enables the circuit formed by the low-impedance generation circuit (circuit consisting of the transistor TR4A and the inverter circuit INV1A or the circuit consisting of the transistor TR4B and the inverter circuit INV1B) and the resistor RA (RB) to function as an impedance adjustment circuit. Therefore, impedance matching can be performed even if the specific impedance of the differential signal lines is changed. The resistor RA (RB) may not be provided when the specific impedance of the differential signal lines is low and impedance matching can be performed only by the input impedance of the low-impedance generation circuit, for example.

10. Electronic Instrument

Figure 16:
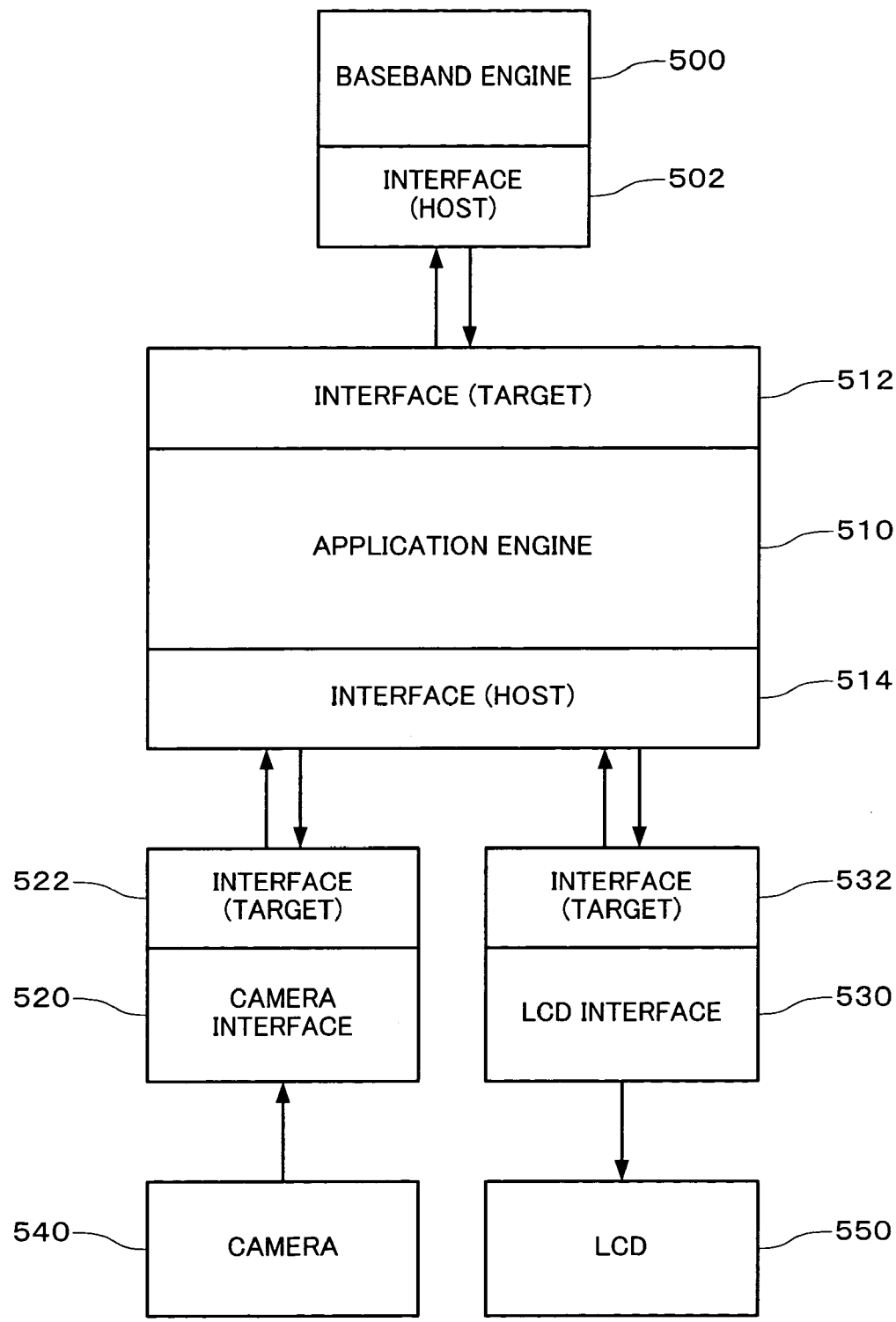
FIG. 16 is a diagram showing an electronic instrument according to one embodiment of the present invention.

FIG. 16 shows an electronic instrument according to one embodiment of the present invention. The electronic instrument includes interface circuits 502, 512, 514, 522, and 532. The electronic instrument includes a baseband engine 500 (communication device in a broad sense), an application engine (processor in a broad sense), a camera 540 (imaging device in a broad sense), and an LCD 550 (display device in a broad sense). The electronic instrument may have a configuration in which some of these sections are omitted. According to the configuration shown in FIG. 16, a portable telephone having a camera function and a display function of a liquid crystal display (LCD) can be implemented. However, the electronic instrument in this embodiment is not limited to the portable telephone, and may be applied to various electronic instruments such as a digital camera, PDA, electronic notebook, electronic dictionary, or portable information terminal.

As shown in FIG. 16, the data transfer described with reference to FIGS. 1 to 3 and 11 is performed between the host-side interface circuit 502 provided to the baseband engine 500 and the target-side interface circuit 512 provided to the application engine 510 (graphic engine). The data transfer described with reference to FIGS. 1 to 3 and 11 is performed between the host-side interface circuit 514 provided to the application engine 510 and the target-side interface circuits 522 and 532 provided to the camera interface 520 and the LCD interface 530.

A portable information instrument such as a portable telephone includes a first instrument section provided with buttons (character panel) for inputting a telephone number or a character, a second instrument section provided with a main liquid crystal display (LCD), a sub LCD, or a camera (one or a plurality of devices), and a connection section such as a hinge which connects the first and second instrument sections. The baseband engine 500, the application engine 510, and the interface circuits (data transfer control devices) 502, 512, and 514 shown in FIG. 16 may be provided in the first instrument section. The interface circuits 522 and 532, the camera interface 520, the LCD interface 530, the camera 540, and the LCD 550 may be provided in the second instrument section. In a conventional method, the data transfer between the first instrument section (first substrate) and the second instrument section (second substrate) is performed using a parallel bus (system bus).

On the other hand, according to the embodiments of the present invention, the data transfer between the first instrument section (first substrate) and the second instrument section (second substrate) is performed using the differential signal lines of the serial bus. Therefore, since the number of interconnects which pass through the connection section between the first and second instrument sections can be significantly reduced, the design and mounting of the connection section can be facilitated. Moreover, occurrence of EMI noise can be reduced. According to the embodiments, since an intelligent power-down control can be performed, power consumption of the electronic instrument can be further reduced.

The present invention is not limited to the above-described embodiments. Various modifications and variations are possible. Any term (such as N-type, P-type, VSS, VDD, host device and target device, strobe, IN transfer and OUT transfer, differential signal lines, baseband engine, application engine, camera, or LCD) cited with a different term having broader or the same meaning (such as first conductivity type, second conductivity type, first power supply, second power supply, device, clock signal, data transfer, serial signal line, communication device, processor, imaging device, or display device) at least once in this specification and drawings can be replaced by the different term in any place in this specification and drawings.

The interface circuit to which the receiver circuit or the transmitter circuit according to the embodiments is applied is not limited to the interface circuit described with reference to FIG. 1. The configuration of the receiver circuit or the transmitter circuit is not limited to the configuration described with reference to FIGS. 3, 11, and 14.

What is claimed is:

1. A transmitter circuit connected to a receiver circuit with differential signal lines interposed, the transmitter circuit comprising:

a current driver which current-drives the differential signal lines; and a voltage driver which is electrically disconnected from at least one of the differential signal lines in a normal transfer mode, and is electrically connected to the at least one of the differential signal lines and voltage-drives the at least one of the differential signal lines in a power-down mode, wherein the voltage driver outputs a power-down voltage for setting the receiver circuit to the power-down mode or a wakeup voltage for canceling the power-down mode of the receiver circuit, to the at least one of the differential signal lines.

2. The transmitter circuit as defined in claim 1, wherein the current driver transmits a power-down command to the receiver circuit by current-driving the differential signal lines in the normal transfer mode.

3. The transmitter circuit as defined in claim 1, wherein the current driver includes:

a first current source provided between a first output node for a first signal line of the differential signal lines and a first power supply; and a second current source provided between a second output node for a second signal line of the differential signal lines and the first power supply, and wherein the voltage driver includes:

a voltage output circuit which outputs the power-down voltage or the wakeup voltage; and a switching element which is disposed between an output of the voltage output circuit and at least one of the first and second output nodes, turned OFF in the normal transfer mode and turned ON in the power-down mode.

4. An interface circuit having differential signal lines, the interface circuit comprising:

the transmitter circuit as defined in claim 1 connected to a receiver circuit of a partner device with first differential signal lines interposed to current-drive the first differential signal lines; and another receiver circuit connected to another transmitter circuit of the partner device with second differential signal lines interposed, the transmitter circuit of the partner device current-driving the second differential signal lines, wherein the receiver circuit of the interface circuit connected to the second differential signal lines includes a wakeup detection circuit, the wakeup detection circuit being set to a disabled state in the normal transfer mode, being set to an enabled state in the power-down mode, and detecting the wakeup voltage to output a signal used to cancel the power-down mode when the transmitter circuit of the partner device has outputted the wakeup voltage to at least one of the second differential signal lines by voltage drive.

5. An interface circuit having differential signal lines, the interface circuit comprising:

the transmitter circuit as defined in claim 1 connected to a receiver circuit of a partner device with first differential signal lines interposed to current-drive the first differential signal lines; and another receiver circuit connected to another transmitter circuit of the partner device with second differential signal lines interposed, the transmitter circuit of the partner device current-driving the second differential signal lines, wherein the receiver circuit of the interface circuit connected to the second differential signal lines includes a wakeup detection circuit, the wakeup detection circuit outputting a wakeup signal when cancellation of the power-down mode is detected after the receiver circuit of the interface circuit has been set to the power-down mode by output of the power-down voltage to the at least one of the second differential signal lines from the transmitter circuit of the partner device.

6. An electronic instrument comprising:

the interface circuit as defined in claim 4; and at least one of a communication device, a processor, an imaging device, and a display device.

7. An electronic instrument comprising:

the interface circuit as defined in claim 5; and at least one of a communication device, a processor, an imaging device, and a display device.

* * * * *